United States Patent
Grabon

[11] Patent Number: 5,914,585
[45] Date of Patent: Jun. 22, 1999

[54] POWER SHARING IN COMPUTING SYSTEMS WITH A PLURALITY OF ELECTRONIC DEVICES

[75] Inventor: Robert J. Grabon, Cedar Rapids, Iowa

[73] Assignee: Norand Corporation, Cedar Rapids, Iowa

[21] Appl. No.: 08/802,508

[22] Filed: Feb. 20, 1997

Related U.S. Application Data

[60] Provisional application No. 60/011,902, Feb. 20, 1996.

[51] Int. Cl.$^6$ ...................................................... H02J 7/00
[52] U.S. Cl. .......................... 320/125; 320/112; 320/115; 320/135; 320/126; 307/64; 307/66; 307/29
[58] Field of Search ................................. 320/117, 135, 320/134, 136, 112, 113, 114, 115, 126, 125, 127; 307/64–66, 18–29, 44–46, 80, 150, 154–156; 364/528.31, 492, 493; 395/182.2, 182.12, 750.01, 750.08

[56] References Cited

U.S. PATENT DOCUMENTS

| | | | |
|---|---|---|---|
| 2,372,971 | 4/1945 | Moore | 429/98 |
| 3,274,476 | 9/1966 | Wildum | 320/112 |
| 3,811,050 | 5/1974 | Michelet et al. | 307/64 |
| 3,919,615 | 11/1975 | Niecke | 320/112 |
| 4,108,341 | 8/1978 | Pettinger | 320/112 |
| 4,345,286 | 8/1982 | Kanayama et al. | 307/18 |
| 4,419,616 | 12/1983 | Baskins et al. | 320/115 |
| 4,481,458 | 11/1984 | Lane | 320/112 |
| 4,531,240 | 7/1985 | Yokomizo | 455/607 |
| 4,539,487 | 9/1985 | Ishii | 307/19 |
| 4,647,831 | 3/1987 | O'Malley et al. | 320/113 |
| 4,659,942 | 4/1987 | Volp | 307/19 |
| 4,672,292 | 6/1987 | Hernandez | 320/113 |
| 4,698,517 | 10/1987 | Tohya et al. | 307/66 |
| 4,716,352 | 12/1987 | Hurn et al. | 320/113 |
| 4,739,242 | 4/1988 | McCarty et al. | 320/113 |
| 4,748,344 | 5/1988 | Sing | 320/112 |
| 5,052,943 | 10/1991 | Davis | 320/115 |
| 5,055,763 | 10/1991 | Johnson et al. | 320/125 |
| 5,124,532 | 6/1992 | Hafey et al. | 320/113 |
| 5,266,838 | 11/1993 | Gerner | 307/29 |
| 5,369,565 | 11/1994 | Chen et al. | 320/115 |
| 5,381,554 | 1/1995 | Langer et al. | 307/66 |
| 5,422,558 | 6/1995 | Stewart | 320/136 |
| 5,635,813 | 6/1997 | Shiga et al. | 320/134 |
| 5,642,517 | 6/1997 | Shirota | 307/23 |
| 5,680,026 | 10/1997 | Lueschen | 320/112 |
| 5,726,506 | 3/1998 | Wood | 307/18 |
| 5,745,670 | 4/1998 | Linde | 307/64 |
| 5,747,889 | 5/1998 | Rayham et al. | 307/25 |

*Primary Examiner*—Peter S. Wong
*Assistant Examiner*—K. Shin
*Attorney, Agent, or Firm*—Akin, Gump, Strauss, Hauer & Feld, L.L.P.

[57] ABSTRACT

A user-wearable docking system includes docking receptacles on a belt for receiving a plurality of electronic devices such as a hand-held personal data terminal, code reader, printer, etc. The plurality of electronic devices that are docked share power pursuant to one of several power management schemes. A power bus, disposed within a belt, connects all docks to supply power therebetween. Sharing battery power resources involves providing battery power for both device operation and for battery to battery recharging. In some embodiments, the power management system first selects one of the available replacement batteries or the batteries of any of the docked electronic devices as the source of power for recharging purposes or for providing power on the power bus, and coordinates periodic selection of other batteries as the source to balance power consumption of the system as a whole, prolonging operational life between stationary recharging of all of the battery powered devices as an interworking system as a whole.

14 Claims, 20 Drawing Sheets

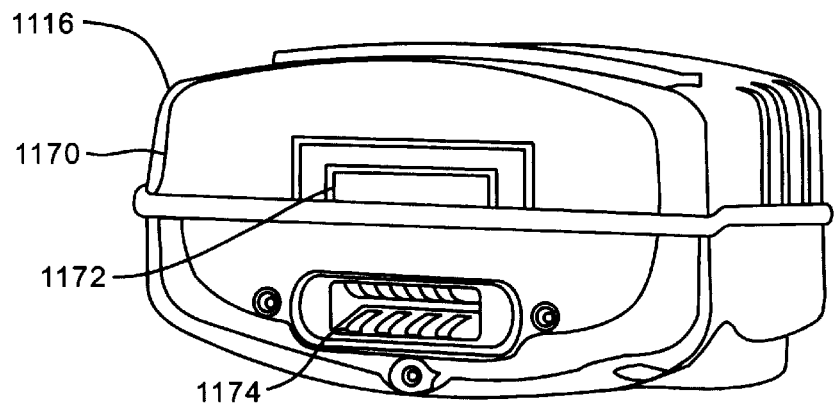
Fig.14
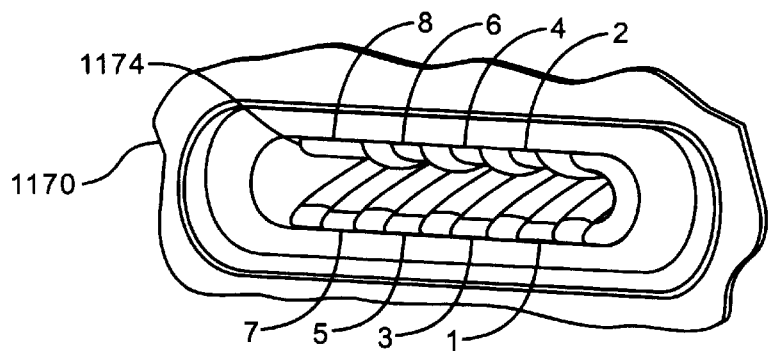
Fig.15
| Pin | Signal | Function |
|---|---|---|
| 1 | BCLK | Battery Clock |
| 2 | 12.0 Volts | Charge Power |
| 3 | GND | Ground |
| 4 | BDAT | Battery Data |
| 5 | TXD | Transmit for Serial Port |
| 6 | RXD | Receive for Serial Port |
| 7 | RTS | Ready to Send |
| 8 | CTS | Clear to Send |
Fig.16

POWER SHARING IN COMPUTING SYSTEMS WITH A PLURALITY OF ELECTRONIC DEVICES

CROSS-REFERENCE TO RELATED APPLICATIONS

The present application is based on U.S. Provisional Application Ser. No. 60/011,902 (Attorney Docket No. DN38236), filed on Feb. 20, 1996. Said application is hereby incorporated herein by reference in its entirety.

BACKGROUND

1. Technical Field

The present invention relates generally to power sharing and power management in electronic systems, and, specifically, to a power management system in an environment in which multiple battery-powered electronic devices share their power resources to maximize operational life. In addition, the present invention also relates generally to a belt shaped personal docking apparatus that can be used to dock multiple battery operated electronic devices, each in its own holster shaped dock.

2. Related Art

Battery powered electronic devices are commonly utilized in business applications to support business operations. For example, in warehousing and route accounting environments, hand-held data terminals and code readers are commonly utilized. Other commonly utilized battery operated electronic devices for business operations include devices for data display, data collection and data transfer.

As the batteries of electronic devices get exhausted after a few hours of operation, they must be recharged. Recharging involves transferring power from one source of power such as a battery charger to a rechargeable battery that is low on power. In environments such as warehouses, docking stations are provided where batteries can be recharged. The docking station is usually placed in a single, fixed location which ties up the electronic device from use during docking. The docking station is usually kept at a distance away from the places of work and provides means to recharge the rechargeable batteries of the electronic devices when the batteries are exhausted. Some docking stations also provide means to transfer data. For example, in the case of batch-type data collection operations in a warehouse, data terminals that are typically employed for data collection may be placed into a docking station to transfer collected data to a remote computer for processing and to recharge the battery of the data terminal.

Electronic devices that perform a lot of functions often tend to be useful. However, such multiple-function electronic devices are often heavy and bulky. Again, as more functionality is added to the electronic devices, they tend to consume more power and make it necessary for an operator to carry replacement batteries in order to keep them operational for extended periods of time. Although such electronic devices perform multiple functions, they become less portable as they get bulkier due to the addition of extra functions.

A common approach to solving the problem of carrying electronic devices has been to provide a holster for the device that can be attached to a belt that is worn by an operator. With the help of the holster and the belt, the hands of an operator can be freed for other activities when the electronic device is not being used. If multiple electronic devices are employed by an operator in any work environment, the operator also typically carries multiple replacement batteries in order to keep all the devices operational for extended periods of time.

When an electronic device such as a data terminal is not docked in its docking station for recharging or data transfer, the data terminal is often carried by hand during operation and may be kept on the person of an operator in a holster for temporary storage. If the operator has to carry multiple electronic devices, the operator is likely to also carry one holster for each electronic device so that the electronic devices may be temporarily stored in the holster when it is not being used by the operator. Moreover, the operator is also likely to carry at least one replacement battery for each electronic device, especially for devices that are important for the business operations that also consume more power and are likely to need replacement batteries.

When multiple electronic devices are employed for business operations by an operator, it is possible to design an application where the electronic devices cooperate to provide services. For such applications, the services are often disrupted when the battery in some of the cooperating devices is exhausted. Thus, in the case of cooperating electronic devices, the devices with more power, that are currently operational, may become less effective due to their dependence on the devices that are currently inoperable and powerless due to exhausted batteries.

In environments where a plurality of electronic devices are used, the power consumption within each battery powered device is managed to prolong the power supply duration of the battery and keep the device operational. However, some devices are used more frequently than others, with the problem of having to replace the batteries or recharging the batteries more often in these devices than in others. When all the replacement batteries have been used up, the devices that need replacements for their batteries become inoperable and must be at least temporarily taken out of service. This problem occurs even when other devices, especially those that are seldom used and still have operational batteries, are available in the vicinity, often carried in holsters on the person of the operator.

Therefore, it would be highly desirable to solve the foregoing and other problems encountered with portable electronic devices.

SUMMARY OF THE INVENTION

Aspects of the present invention can be found in a portable battery management system built in accordance with the present invention. The battery management system comprises a plurality of electronic devices, a belt and a power bus. Each of the plurality of electronic devices contain a battery and independently operate when powered by the battery. The belt that supports the plurality of electronic devices, and has the power bus attached thereto. The power bus connectively engages ones of the plurality of electronic devices that are supported by the belt. In addition, at least one of the plurality of electronic devices being designated to provide power from its battery to the power bus when the at least one of the plurality of electronic devices is supported by the belt. The power bus supplies power from the at least one of the plurality of electronic devices to the others of the plurality of electronic devices that are supported by the belt and are connectively engaged to the power bus.

In some embodiments, the portable battery management system of claim 1 further comprises one or more independent batteries selectively supported by the belt. When the batteries are supported by the belt, they are coupled to the power bus. These one or more independent batteries are capable of replacing the batteries in one or more of the plurality of electronic devices. Further, the one or more independent batteries can be used as a power source to supply power on the power bus before the battery of one of the plurality of electronic devices is used to supply power to the power bus. In such and other embodiments, a hierarchy of power sources may be identified to supply such power on the power bus.

Moreover, for example, the portable battery management system may also collect information from at least one of the plurality of electronic devices to identify at least one of the plurality of electronic devices to be used in supplying power to the power bus.

Other aspects of the present invention may be appreciated with reference to the remaining specification and drawings.

BRIEF DESCRIPTION OF THE DRAWINGS

The numerous objects and advantages of the present invention may be better understood by those skilled in the art by reference to the accompanying figures in which:

FIG. 14 is an elevation view of a typical hand-held data terminal to be utilized in conjunction with the present invention having a standard docking connector;

FIG. 15 is an illustration of a typical standard eight contact docking connector shown on the terminal of FIG. 14;

FIG. 16 is a table showing a typical pin-out configuration of the standard contact docking connector of FIG. 15.

DETAILED DESCRIPTION

Figure 1:
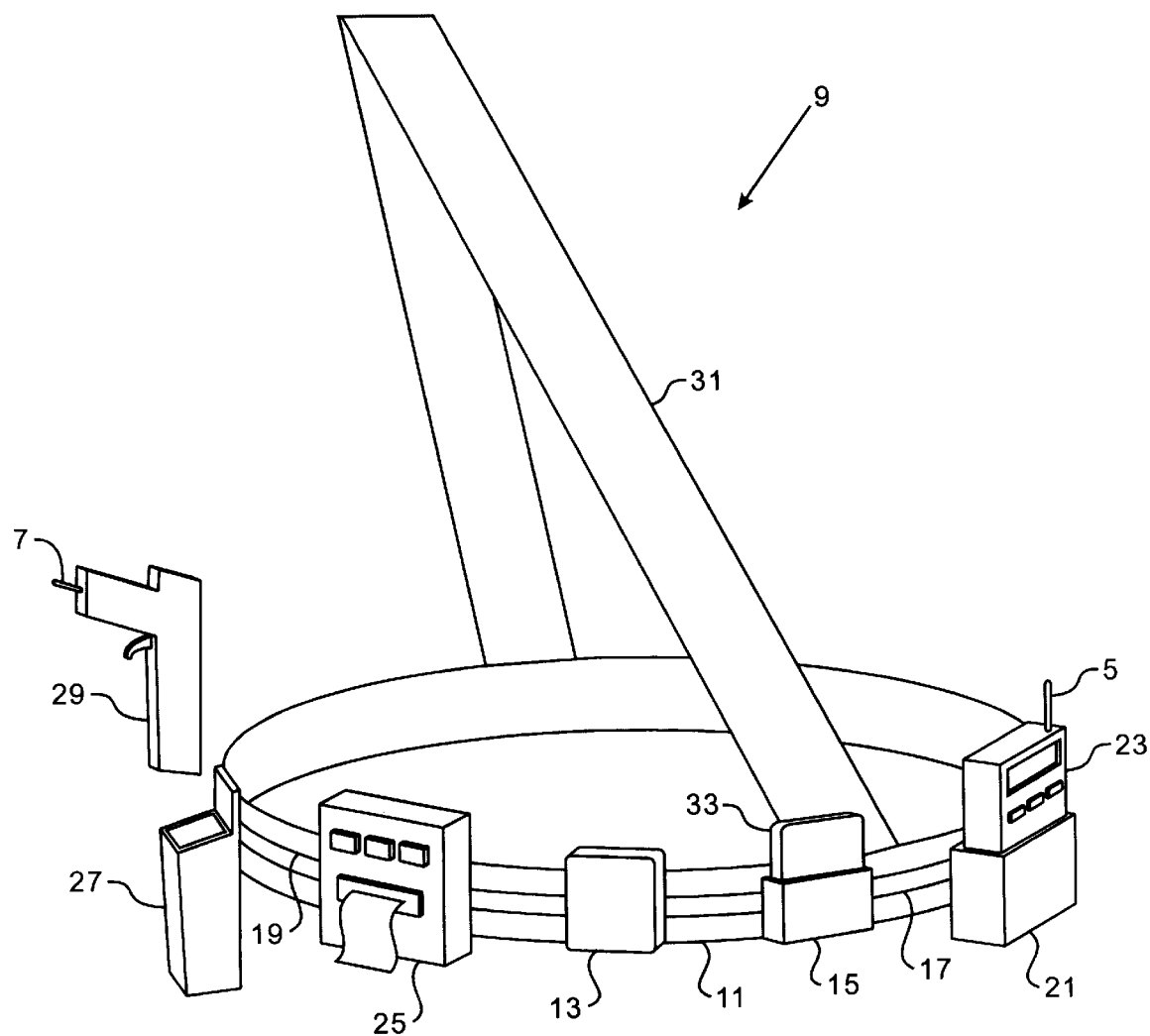
FIG. 1 is a diagrammatic representation of an exemplary portable power management system built in accordance with the present invention wherein a belt not only supports a plurality of battery powered electronic devices but also couples holstered devices for communication and battery power management purposes.

FIG. 1 is a diagrammatic representation of an exemplary portable power management system 9 built in accordance with the present invention wherein a belt not only supports a plurality of battery powered electronic devices but also couples holstered devices for communication and battery power management purposes. The exemplary portable power management system 9 might be a configuration used for warehousing or route accounting operations.

In particular, in the portable power management system 9, a plurality of electronic devices, i.e., a code reader 29, a printer 25, and a hand-held computing device 23, are used by an operator with support from a belt 11. The belt 11 may include a buckle 13 and a strap 31 for additional support. The operator uses the code reader 29 to collect information from coded images such as bar codes, and may wirelessly communicate via an antenna 7 with, for example, the computing device 23. In addition in the alternative, the code reader 29 may communicate collected information to the computing device 23 via a communication bus 19 that is disposed on the belt 11 when inserted into a dock 27. The code reader 29 is carried in the dock 27 that is attached to the belt 11 when not in use.

Likewise, the computing device 23 may collect and communicate data to the code reader 29 wirelessly via an antenna 5 and/or via the wired communication bus 19. The printer 25 may also communicate with either the code reader 29 or with the computing device 23 via the communication bus 19. Although wireless capability is not shown in the printer 25, it may also be included therein. Although it may be removed, the printer 25 directly attaches to and hangs from the belt 11 during most operations.

The docks may be shaped as holsters or as pouches, as illustrated. Upon insertion into a dock, the electronic device engages the communication bus 19 and a power bus 17. As mentioned previously, the communication bus may be used to communicate data collection information among the electronic devices that are docked. The communication bus 19 is also used to communicate higher level power control information, when implemented.

The power bus 17 supports power management functionality amongst the plurality of docked electronic devices. A major aspect of power management involves the sharing of battery power functionality amongst the plurality of docked electronic devices. Power sharing involves one or more of the docked devices providing all or some operational power to the others of the plurality of electronic devices when they are docked. Depending on the specific embodiment, power sharing may further involve one or more of the docked devices providing recharging power to the others of the plurality of electronic devices when they are docked, for operational power when they are not docked.

A replacement rechargeable battery 33 may also be used in the portable power management system 9. Upon insertion of the battery 33 into a dock 15, the power from the battery 33 is made available to the plurality of docked electronic devices via the power bus. A plurality of replacement batteries can be used in the portable power management system 9.

For example, the code reader 29 may be designed as a small light weight unit with minimal battery capacity even if it to be used for extended periods of time if the device is able to recharge itself when it is docked. For example, instead of using a large battery that would provide power for eight hours of operation in a warehouse, the code reader in an exemplary configuration would employ a much smaller and lighter battery that would last for half-an-hour of continuous operation. Such a smaller battery would then be charged using power from the power bus whenever the device was docked between operations and the code reader would be operational for extended periods of time.

Figure 2B:
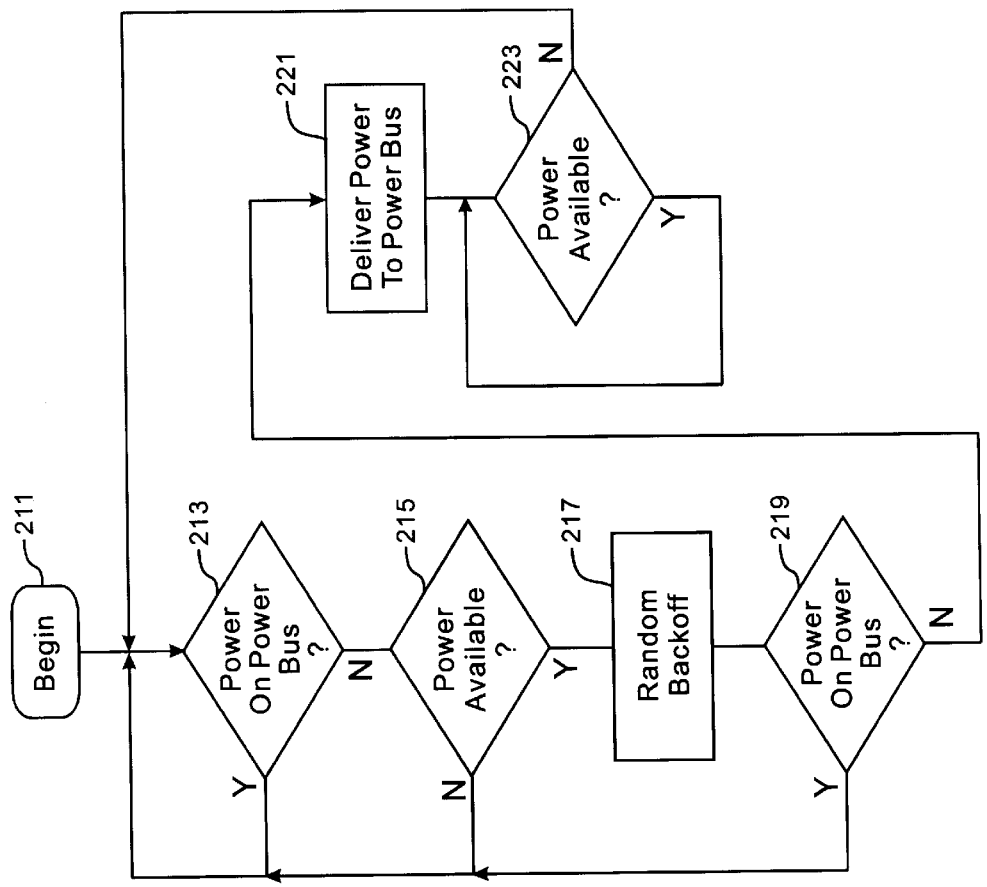
FIG. 2b is a flow diagram that describes the operation of an exemplary embodiment of the portable power management system where the individual electronic devices monitor the delivery of power on the power bus to determine if their batteries need to start delivering power on the power bus.
Figure 2A:
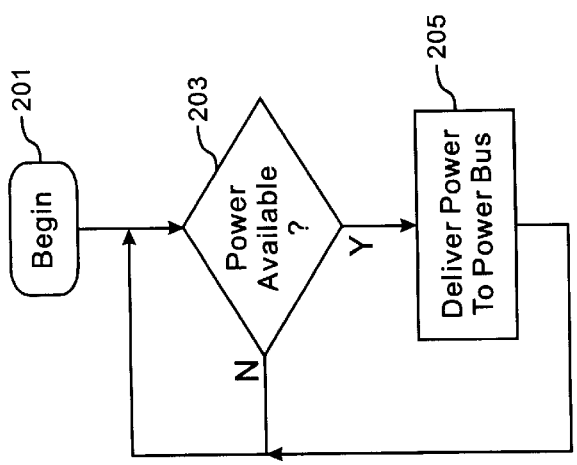
FIG. 2a depicts the operation of an exemplary power management system where the battery of one of the plurality of electronic devices depicted in FIG. 1 is used as a designated power source for the others of the plurality of electronic devices attached to the power bus.

FIG. 2a depicts the operation of an exemplary power management system where the battery of one of the plurality of electronic devices depicted in FIG. 1 is used as a designated power source for the others of the plurality of electronic devices attached to the power bus. In this situation, the electronic devices that are not designated as the power source may not be aware of the power management system, while they consume power available on the bus as they would from a charging unit. Therefore, standard off-the-shelf electronic devices can participate in this power management system.

In an exemplary configuration, the power management system of FIG. 2a designates one of the replacement batteries, such as the replacement battery 33 of FIG. 1, as the power source and the designated replacement battery provides power on the power bus to the electronic devices and to other replacement batteries. The power bus is used to supply operational power to the devices and also power to recharge the batteries. When the devices are docked in their docks, they consume power from the power bus 17 of FIG. 1 instead of their own batteries, as long as the power bus can supply power. This power on the power bus is delivered by the replacement battery 33 of FIG. 1 when it is docked in its battery dock 15, as long as the replacement battery can supply power. The power supplied by the replacement battery 33 can also be used to recharge the batteries currently plugged into the electronic devices while they are docked in their respective docks.

For example, in FIG. 1, instead of drawing power from other devices, the code reader 29 might utilize power from the battery pack 33 if available. In addition, the battery pack may be used by other devices.

The battery 33 may be used to replace a compatible exhausted battery in any one of the electronic devices if the devices can work on similar batteries. The replacement rechargeable battery 33 is typically usable only in some subset of the devices carried by an operator.

Referring to the power management system of FIG. 2a, at a block 201, the power management system starts its operation. At a block 203, the power management system determines if the power source (for example, the replacement battery 33 of FIG. 1) has power available so that power could be delivered to the power bus. If power is available, it is delivered to the power bus at a block 205. If power is not available or if the power in the power source if below a threshold value, delivery of power to the power bus 17 of FIG. 1 is halted.

In an more specific exemplary embodiment of the power management system of FIG. 2a, a replacement battery is considered as the primary source of power on the power bus and it supplies power on the power bus until its power is depleted or until its power falls below a threshold limit. In an alternate exemplary embodiment of the power management system of FIG. 2a, the battery of some electronic device such as the printer 25 of FIG. 1 may be considered to be the source of power on the power bus 17.

To recharge batteries with low power levels, especially when no replacement battery is available or when the replacement battery is also low in power level, the batteries in any of the currently docked electronic devices with sufficiently high power level can be used as a source of power. Similarly, to supply power to the devices that are currently docked, the power on the power bus my be supplied by the battery of any of the currently docked electronic devices with sufficiently high power level.

FIG. 2b is a flow diagram that describes the operation of an exemplary embodiment of the portable power management system where the individual electronic devices monitor the delivery of power on the power bus to determine if their batteries need to start delivering power on the power bus. In such a power management system, each battery operated electronic device that is capable of delivering power may operate in cooperative mode and voluntarily deliver power to the power bus when they are able to access the power bus. To access the power bus, each electronic device and replacement battery that participates as a potential power source may monitor the power bus in order to detect a disruption of power on the bus. When a power disruption is detected by a potential power source, it pursues a random backoff strategy to determine if it should become the next power source. Such a strategy involves monitoring the power bus after a randomly generated backoff period and supplying power on to the power bus if power is not being delivered by any other electronic device or battery after the random backoff period.

The power management system of FIG. 2b is a decentralized one, with the functionality described by FIG. 2b incorporated into each electronic device that actively participates in delivering power to the power bus as part of the power management system. Referring to FIG. 2b, the decentralized power management system of each electronic device starts at a block 211. At a block 213, an attempt is made to detect power on the power bus 17 of FIG. 1. If the power bus is found to be supplying power, then control is passed to the decision block 213 for further monitoring.

If, at the decision block 213, it is discovered that the power supply on the power bus has been disrupted, the potential power source determines if it can be the next source of power at a block 215. If its power level is below a threshold, or if it has no power to supply, the potential power source returns control back to the block 213 for further monitoring. If, at the block 215, the potential power source determines that it can supply power on the power bus, it initiates a random backoff strategy at a block 217 before attempting to access the power bus at a block 219.

At the block 219, if the potential power source determines that power is already being supplied on the power bus by some other source of power, it returns control to the block 213 for further monitoring. If, at the block 219, the it is determined that there is no power supply on the power bus, the potential source of power starts delivering power to the power bus at a block 221. Power is delivered until the power is depleted or until the power level falls below a threshold level. The termination of power supply is detected at a block 223 and control is returned to the block 213 for further monitoring.

More specifically, in one exemplary embodiment of the current invention shown in FIG. 1, the replacement battery 33 is used as the primary source of power to all the electronic devices that are currently docked in their docks. When the power in the replacement battery 33 is exhausted, or below a threshold level, the battery of the printer 25 replaces the replacement battery 33 as the source of power, if its power level is high enough to permit its operation as a power source. In such a situation, the printer 25 monitors the power bus periodically to see if the power bus is able to provide consumable power to the electronic devices that are currently docked. As soon as the printer 25 determines that the replacement battery, or the device currently supplying power, has stopped supplying power, it connects its battery to the power bus and causes its battery to supply power on the power bus after waiting for a random backoff period and discovering no power on the power bus. Similarly, a different electronic device may fill in for the replacement battery instead of the printer, as a source of power supplied over the power bus.

The portable power management system of FIG. 2b provides a facility to share power. However, individual electronic devices may continue to use the power supplied by their own batteries when they are docked while also consuming power from the power bus. Again, when power supply on the power bus is disrupted, the electronic devices may choose to consume power from their own batteries. In one such exemplary embodiment of the current invention, the printer 25 acts as the primary source of power for the power bus. It provides power to all the devices that are currently docked in their respective docks, even when a replacement battery is available. The printer continues to supply power until its power level falls below a threshold level, or until it exhausts its battery. When the printer stops supplying power on the power bus, the batteries in each electronic device starts delivering power to its associated device, as necessary.

In a different embodiment, this approach may be generalized to include the batteries of other devices in addition to the battery of the printer. It is possible to arrange a hierarchy of batteries as the sources of power to be supplied over the power bus. Such a hierarchy could be static or dynamic in nature. The devices would be responsible to monitor the power bus to determine if their batteries should start supplying power on the power bus. Alternately, a portable power management system may be set up where one of the devices that is considered non-essential is targeted as a power source and drained of its power after the power in the replacement battery is exhausted. When this occurs, the device that becomes a power source is subsequently made inoperable until its battery is charged again.

Figure 2C:
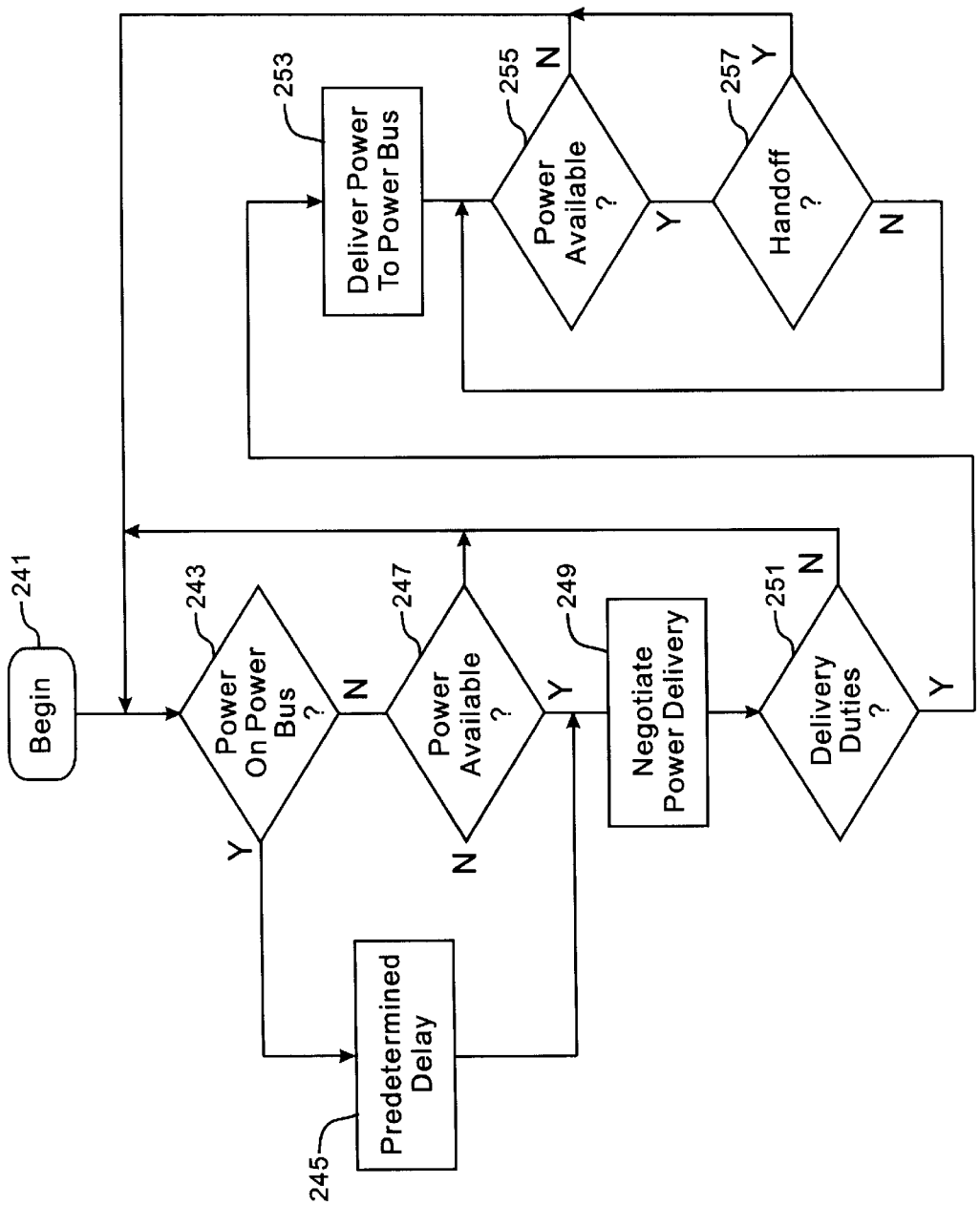
FIG. 2c is a flow diagram that describes the operation of another exemplary portable power management functionality that is associated with electronic devices that participate as potential sources of power in the power management system of FIG. 1.

FIG. 2c describes another exemplary portable power management functionality that is associated with electronic devices that participate as potential sources of power in the power management system of FIG. 1. Such power management functionality can be located in electronic devices or there holsters that act as docks. The power management system of FIG. 2c makes it possible for devices that are replaced in their docks to volunteer to supply power on the power bus as soon as they are docked. If the power level of the battery of the electronic device (a potential power source) that is most recently docked is higher than that of the power source supplying power on the power bus, these two devices will negotiate to determine if there needs to be a change in power sources. Such negotiation would involve communication between the power source and the electronic device that is most recently docked. It is also possible to take into consideration the power levels of other potential power sources during such negotiations.

With reference to FIG. 2c, the power management functionality of the device that participates as a potential power source starts at a block 241 and determines if the power bus is supplying power at a block 243. If the power bus is currently supplying power, a timer with a predetermined delay is set at a block 245 in order to participate in power negotiation later at a block 249, after the disruption of power on the power bus is discovered at a block 247.

When a disruption in power supply is discovered at the block 247, the elctronic devices or batteries that participate in power management as potential power sources negotiate on determining the next source of power for the power bus at a block 249. Such negotiations involve communications between the participating devices and replacement batteries over the power bus, or alternately, over the communication bus.

If, at a block 251, the power management functionality of the electronic device identifies itself as a power source, power is delivered to the power bus at a block 253 until power depletion is discovered at a block 255 or until power supply handoff to another device or battery is discovered at a block 257 due to subsequent negotiations.

Figure 2D:
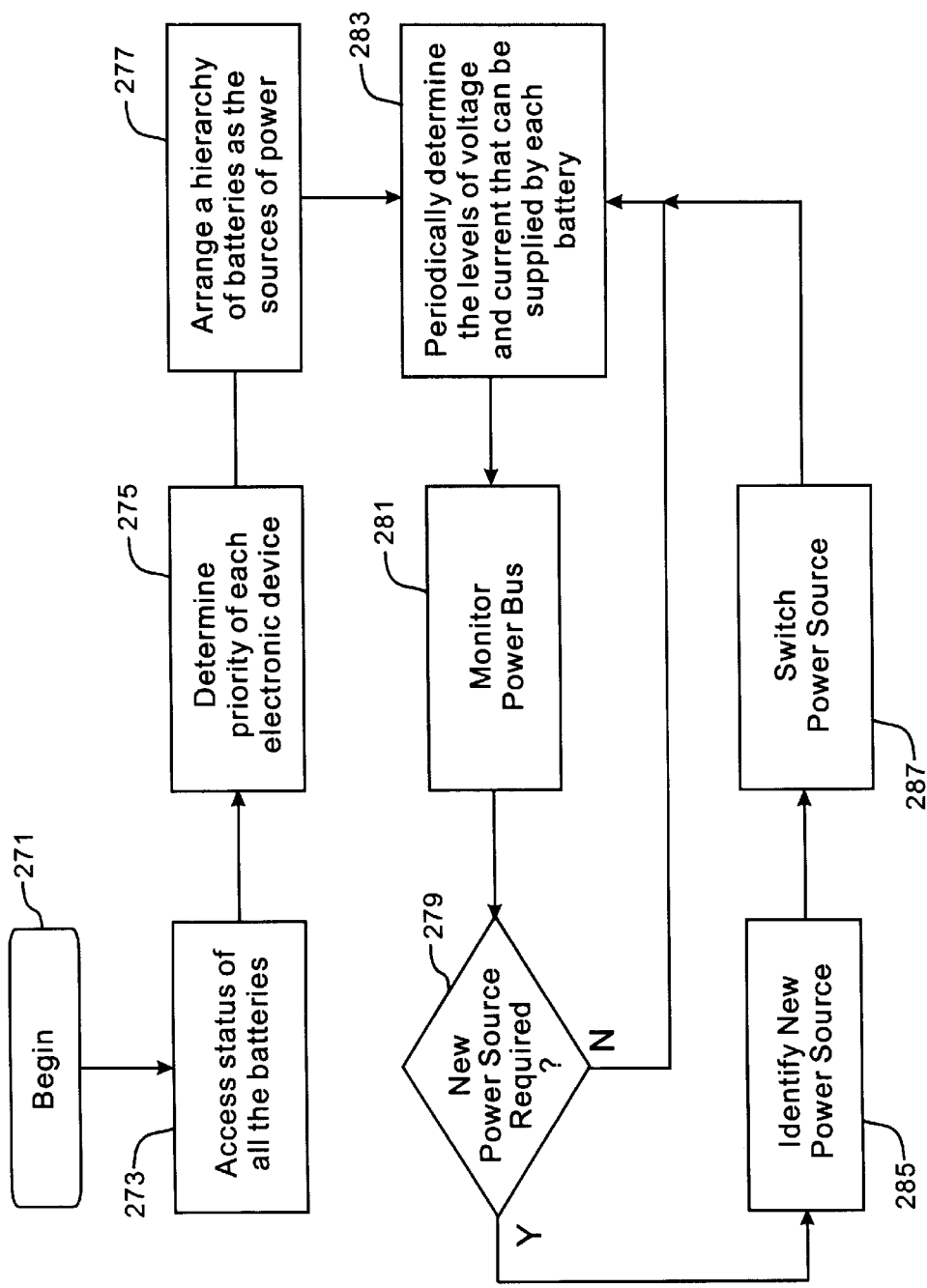
FIG. 2d is a flow diagram that depicts the operation of a power management system that incorporates the specification of a hierarchy of batteries as power sources for the power bus and identifies a new power source using information collected on the status of the batteries and their current voltage level and current levels, when required.

FIG. 2d describes another approach to portable power management that involves the dynamic identification of the potential source of power among all the batteries, taking into consideration the status of all the batteries, the levels of voltage and current that can be supplied by each battery, and the priority of each electronic device. The portable power management functionality of FIG. 2d is a centralized approach where such could be located in one of the batteries or in one of the devices. Such a portable power management system would require communication between the power management system and the different batteries, with the ability to determine the status of all the batteries when required. The communication between the batteries could be carried out over the power bus. Alternately, such communication could be handled over a communication bus 19 of FIG. 1.

FIG. 2d depicts the operation of a power control circuitry that incorporates the specification of a hierarchy of batteries as power sources for the power bus and identifies a new power source using information collected on the status of the batteries and their current voltage level and current levels, when required. The functionality provided by the power control circuitry is termed a power management system. At a block 271, the power management system is activated. At a block 273, the power management system access the status of all the batteries. It then determines the priority of each electronic device at a block 275. This information is important to determine the potential sources of power when the current source of power for the power bus is exhausted.

At a block 277, the power management system arranges the batteries of all the electronic devices currently available in a hierarchy for the supply of power to the power bus. This hierarchy serves as a guide while determining subsequent sources of power as replacements to the current source of power. At a block 283, the power management system periodically determines the levels of voltage and current that can be supplied by the battery of each electronic device. It also periodically monitors the power bus at a block 281 to ensure power supply to all the devices. The power management system also determines the need to replace the current power source by a new power source at a block 279. If the current power source is determined to be a capable power source at the block 279, the power management system returns control to the block 283.

If, at the block 279, it is determined that the current power source needs to be replaced, the power management system identifies a new power source at a block 285. In order to identify the new power source, the power management system takes into consideration the priority of the potential sources of power, the current status of the batteries of these potential sources of power, and the levels of voltage and current that these potential power sources can provide. It also determines the duration for which the replacement source can be expected to be effective before the next replacement may have to be identified.

After identifying the replacement for the current source of battery power at block 285, the power management system causes the old power source to switch off power supply to the power bus and the new power source to switch on. This switch in power source is accomplished with disrupting the operation of the electronic devices. One simple way of ensuring continuity of operation of each electronic device is to cause the individual batteries of each electronic device to provide power to the associated device for the short duration of the replacement of power sources for the power bus. Other similar mechanisms are also possible to accomplish this task.

The power management system may be embodied in a power control circuitry. Alternately, for a system of multiple electronic devices, the power control functionality may be located in a device that acts as a power controller. Not all devices need to have such a functionality. To manage the power of multiple devices, and to facilitate power sharing, the power control functionality may be located in at least one of the electronic devices while all devices need to support a power control protocol. Such a protocol would involve the ability to query the status of the different batteries over the power bus, the ability to designate one of a plurality of batteries as a source of power, and the ability to switch between different batteries for power.

One advantage of being able to share batteries across devices in a power management system is that the operator can carry fewer replacement batteries for multiple devices. This also reduces the total weight that an operator wearing the belt of FIG. 1 has to carry. When the power level of a battery is running low, the power management system can cause another battery at an higher power level to recharge the one at a lower power level, especially if the device associated with the battery with lower power level is considered more important and critical than the device with a higher powered battery.

Different electronic devices seldom work on the same type of batteries. Typically, the required battery voltages and current levels are different for different devices. The ability to share batteries across different types of batteries is another advantage of this invention. This is enabled by having the individual batteries supply a standard voltage to the power bus so that the different devices can access the power bus and consume power at the same standard voltage. To deliver power to the power bus at the same standard voltage or current level, the power from the individual batteries in each device is subjected to power regulation before being supplied to the power bus. This regulation operation can be performed by a regulator located within the battery, within the electronic device, or externally at the dock of the device.

The electronic devices can communicate over a communication bus 19 of FIG. 1 when the devices are docked in their respective docks. For example, referring to FIG. 1, the code reader 29 of FIG. 1 can send information to the printer 25 over the communication bus 19 when it is docked into its dock 27, in order to print information on collected data. When the printer 25 is capable of receiving data over an RF link, the code reader 29 selectively communicates information to the printer over the RF link as long as the power level of the battery permits such communication. If the battery power level is low in the code reader 29, RF communication between the device 29 and the printer 25 can be discontinued. Subsequent communication between the code reader 29 and the printer 25 is resumed over the communication bus 19 when the code reader 29 is docked into its dock 27.

In a simple embodiment of the portable power management system, the power management functionality can be located in a special backup replacement battery, such as the replacement battery 33 in FIG. 1. It is also possible to locate it in an electronic device such as a printer or a code reader. The main responsibility of the power management functionality would include collecting information on the status of the batteries in the different devices, collecting information on the power levels of the different devices, arranging for the supply of power on the power bus by the replacement battery or the battery of one of the electronic devices, monitoring the power bus, and switching the source of power from a battery of one device to a battery of another device as and when required.

Figure 3A:
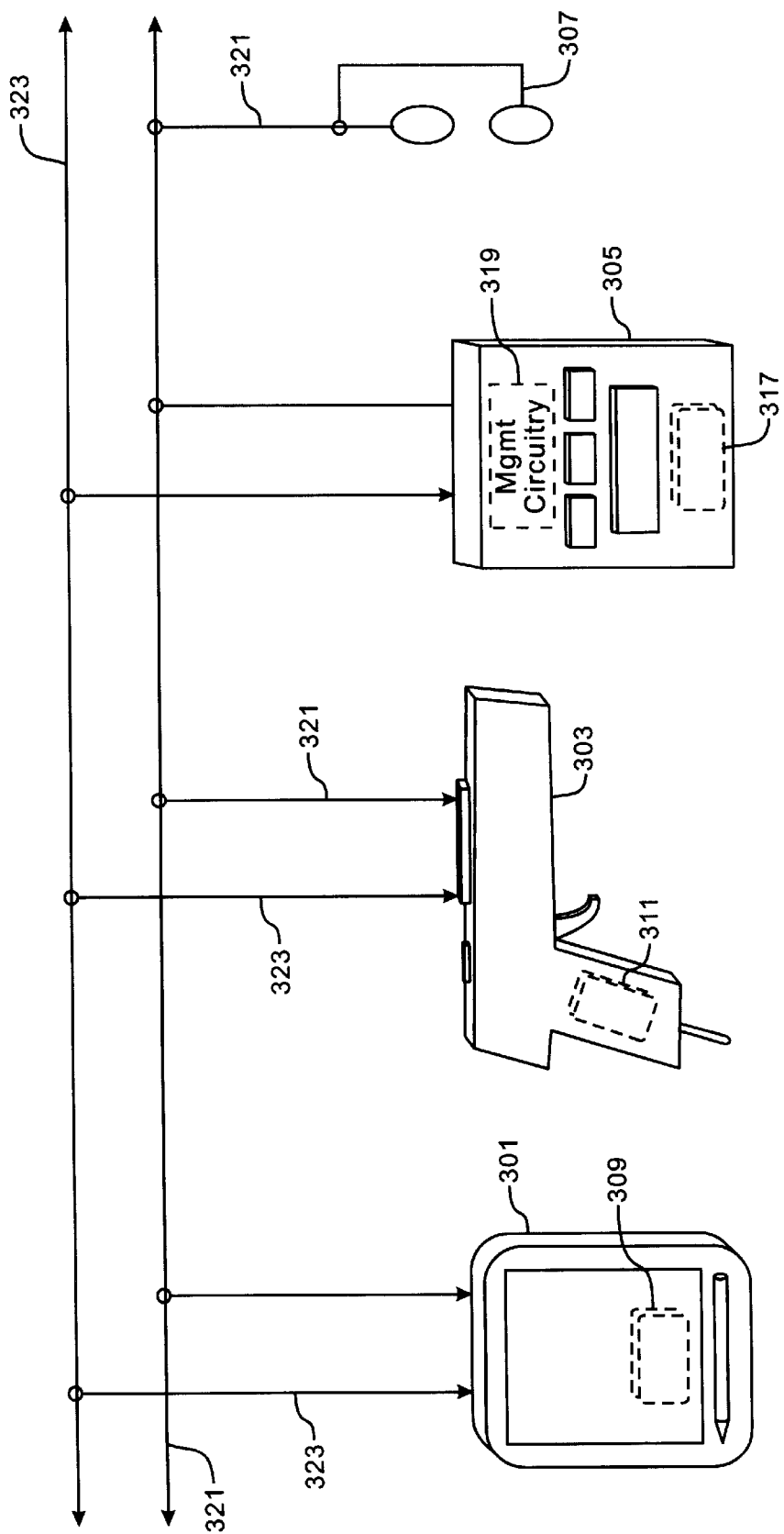
FIG. 3a depicts an exemplary power management system where the power management functionality is incorporated as part of one of the electronic devices docked on the power management system of FIG. 1.

FIG. 3a depicts an exemplary power management system where the power management functionality is incorporated as part of one of the electronic devices docked on the power management system of FIG. 1. Specifically, a management circuitry 319 incorporated within an electronic device 305 manages power for multiple electronic devices that can share power over a power bus 321. In reference to FIG. 3a, the electronic device 305 is a printer, although it could have been any other kind of electronic devices. A computing device 301, a code reader 303, and a printer 305 are connected to the power bus 321. The printer 305 includes the management circuitry 319 that embodies the power management functionality.

The management circuitry 319 controls power bus 321 and facilitates the delivery of power on the power bus 321 to each electronic device capable of consuming the power from the power bus. It can cause the battery 317 of the printer 305 to provide power to other devices on the power bus. When the battery of the printer is no longer capable of supplying power to other devices, or when it its power is below a threshold level, the management circuitry 319 causes the power bus to stop supplying power. If another participating device on the power bus also has a management circuitry similar to the management circuitry 319, the management circuitry 319 may cause the battery of that electronic device to start supplying power on the power bus.

In the situation where all electronic devices or their docks have a management circuitry, the management circuitry 319 also facilitates the recharging of the battery of an electronic device using a battery of another device as a source of power. For example, the management circuitry 319 in the printer 305 collects information on the status of the batteries (309 and 311) over the power bus 321 and determines the source and destination batteries for recharging other batteries. It also sends messages to the individual batteries to prepare them for recharging. The management circuitry of the batteries targeted for recharging are required to enable the recharging operation and connect the associated electronic device to the power bus 321. The battery that is determined to be the source of power is also sent a message to prepare it for the discharging of its power.

The power bus 321 is connected to external recharging contacts 307. The external recharging contacts 307 may be connected to a vehicle power systems or an external power supply. The external power supply may also have a management circuitry. The management circuitry 319 identifies the availability of an external power source and causes the individual batteries in each electronic device to recharge from the external power source when one is available.

The management circuitry 319 in FIG. 3 is located within the printer 305. Alternately, the master controller may be located in one of the other electronic devices. Another option is to locate the master controller externally to all the devices.

Figure 3B:
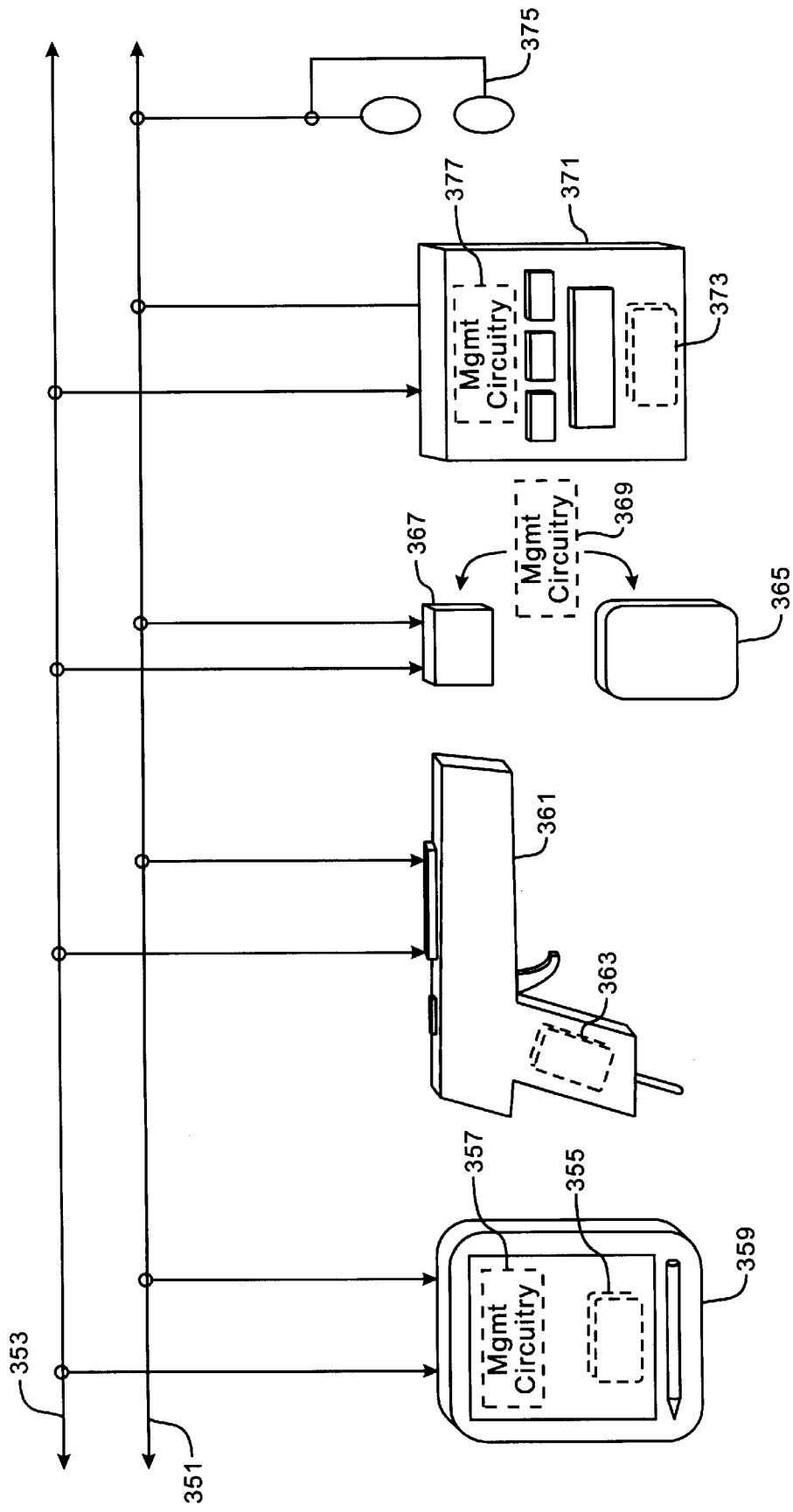
FIG. 3b depicts another exemplary portable power management circuitry for FIG. 1 where the management circuitry embodying the portable power management functionality is incorporated into multiple electronic devices, batteries, and some docks attached to the power bus, but not all electronic devices attached to the power bus need to have one.

FIG. 3b depicts another exemplary portable power management circuitry for FIG. 1 where the management circuitry embodying the portable power management functionality is incorporated into multiple electronic devices, batteries, and some docks attached to the power bus, but not all electronic devices attached to the power bus need to have one. For example, the printer 371 and the computing device 359 incorporate management circuitry 373, 357. Moreover, the replacement batteries are controlled by a management circuitry 369, which may be part of the battery 365 or part of the holster shaped dock 367. Power management is implemented by the cooperation of the management circuitry in the various devices.

FIG. 3b also indicates that not all electronic devices need to incorporate the power management circuitry. For example, the code reader 361 does not have a management circuitry. It still consumes power supplied over the power bus when it is docked, and its battery 363 can be charged by the power supplied over the power bus.

Figure 4:
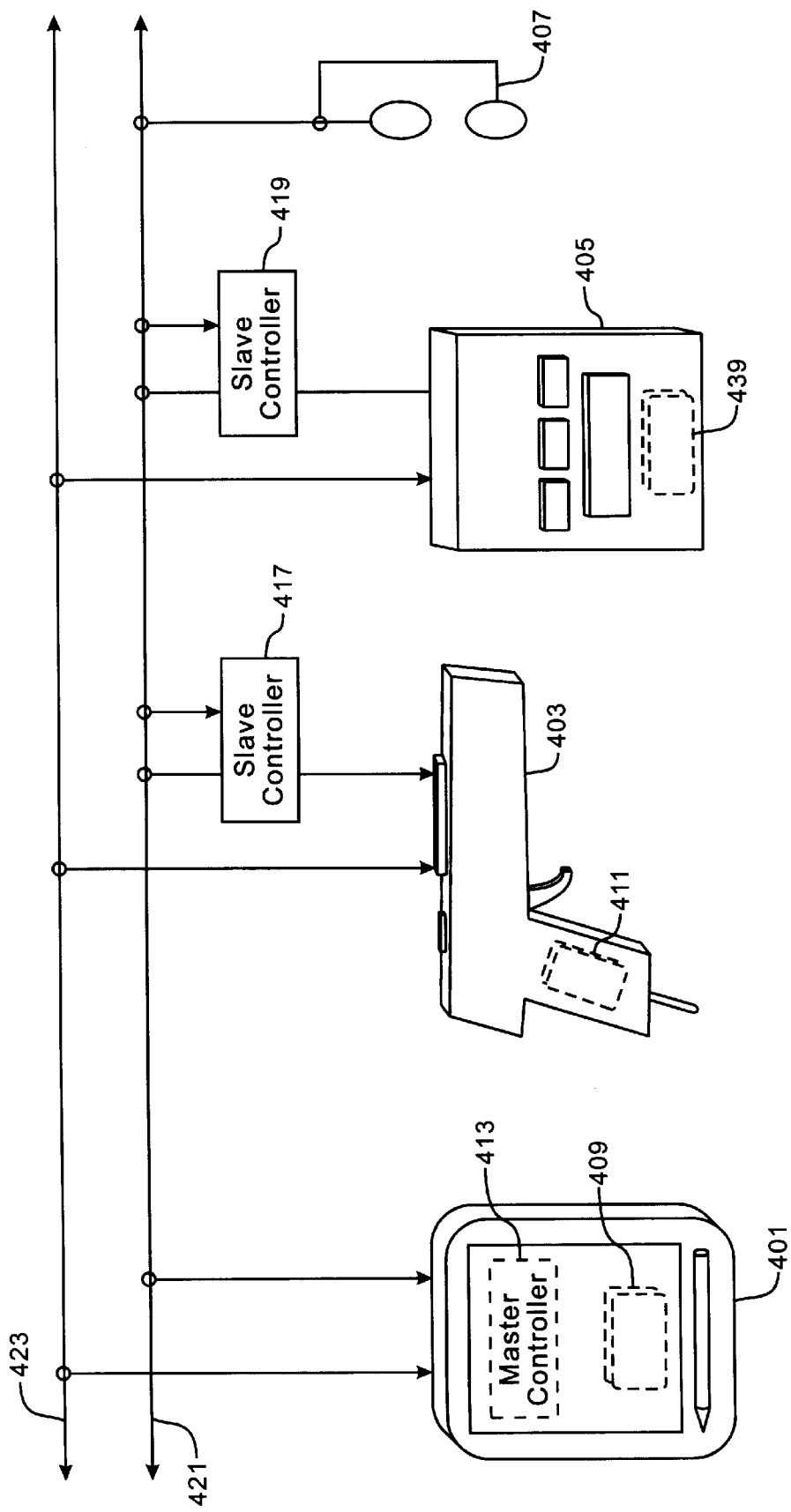
FIG. 4 depicts a power control circuitry with an external master controller that manages power for multiple electronic devices that can share power over a common power bus.

FIG. 4 depicts a power control circuitry with an external master controller that manages power for multiple electronic devices that can share power over a common power bus. Each device that needs to access power from a power bus 421 participates in a power management system that is embodied in one master controller 413 and a plurality of slave controllers. The master controller 413 interacts with the plurality of slave controllers to manage the delivery of power from the batteries of one or more devices to the others. A slave controller 417 facilitates the charging or discharging of a battery 411 of a code reader 403, as part of the power control functionality, under the control of the master controller 413. Similarly, a slave controller 419 facilitates the charging or discharging of a battery associated with a printer 405, as part of the power control functionality, under the control of the master controller 413. The master controller 413 also manages the charging of the batteries of all the electronic devices from an external power source, made available via an external power contact 407, and over the power bus 421.

In another embodiment of the present invention, the master controller can cause more than one battery to simultaneously provide power to the power bus. This would require the ability to connect the two batteries as the sources of power for the power bus.

In yet another embodiment of the present invention, the master controller can cause two different batteries from two different electronic devices to alternately provide power to the power bus by periodically switching the connection of the two batteries to the power bus. This would require the ability to alternate the two batteries as the source of power.

Figure 5:
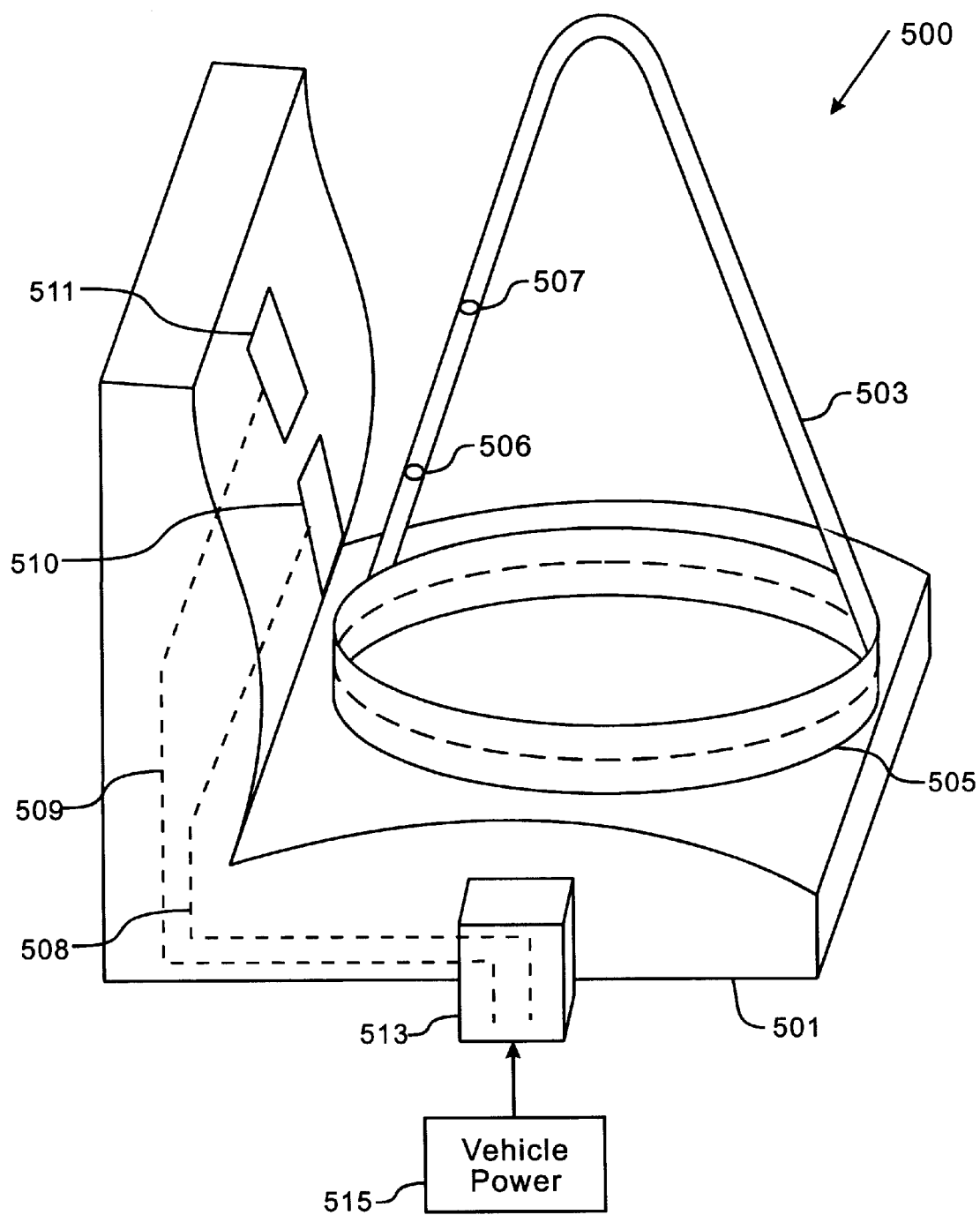
FIG. 5 is a perspective view illustrating a portable power management system (such as that of FIG. 1) gaining access to external power resources of a vehicle.

FIG. 5 is a perspective view illustrating a portable power management system (such as that of FIG. 1) gaining access to external power resources of a vehicle. In particular, vehicle power is utilized to provide operational and recharging power to the individual batteries of the multiple electronic devices that are docked in a belt 505. The vehicle power is made available at contacts 510 and 511 from a vehicle power source 515, typically the vehicle battery, via a control unit 513 and wires 508 and 509. The control unit 513 contains power management circuitry and functions as any replaceable battery might operate within the portable power management system, as previously described.

The contacts 510 and 511 are glued to a seat 501 in the vehicle in an orientation that generally corresponds to the location of contacts 506 and 507 when the driver wearing the system 500 sits on the seat 501. The contacts 506 and 507 may be adjustably positioned on a strap 503 to correspondingly engage the contacts 510 and 511, respectively, accommodating drivers of differing height or sitting position.

The contacts 510 and 511 contain magnetic portions built therein. The contacts 506 and 507 are iron based. Thus, when the driver is seated, the contacts 506 and 507 are magnetically drawn to the contacts 510 and 511. Other means for binding such as velcro may alternately be implemented.

Figure 6:
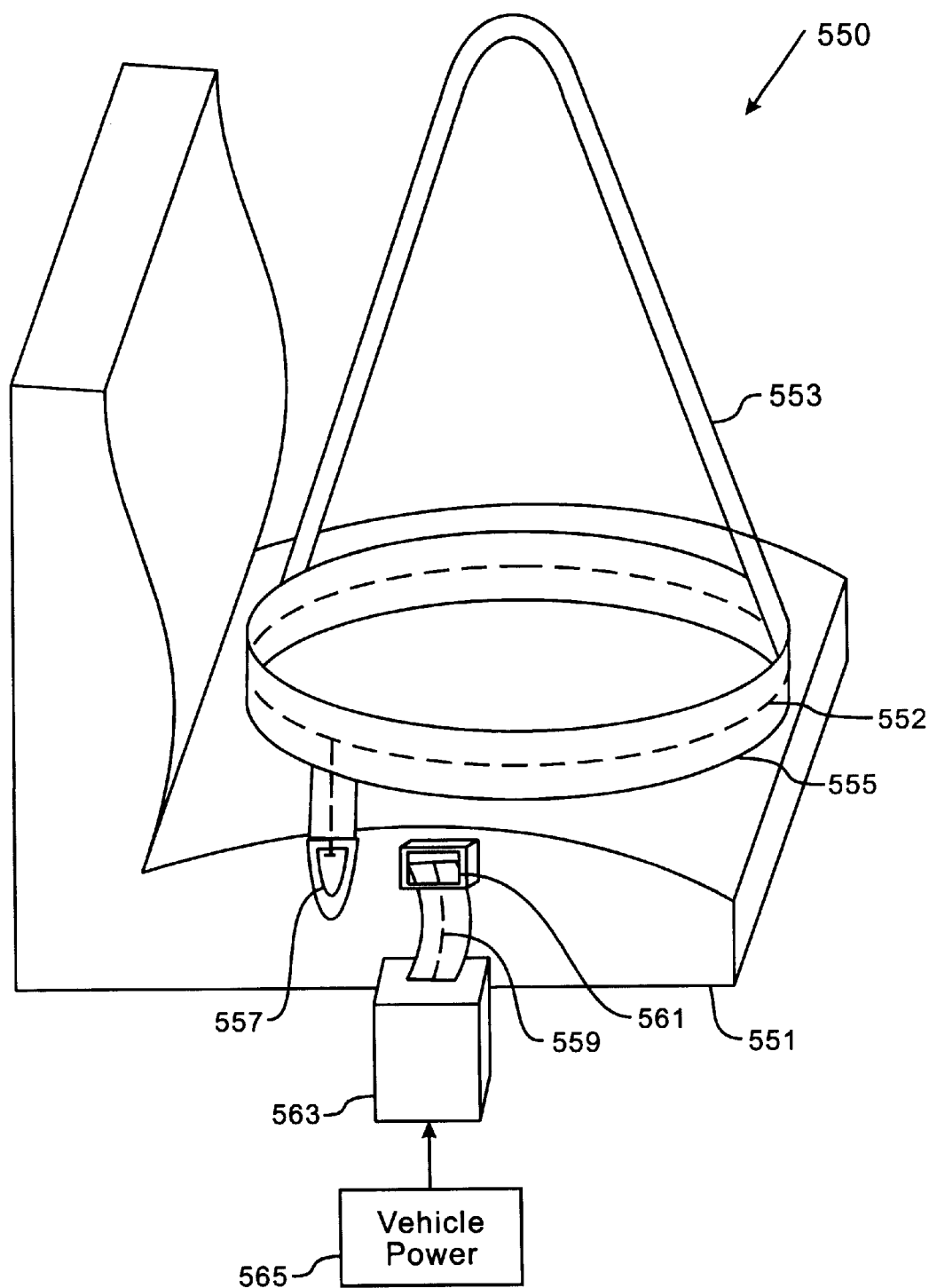
FIG. 6 is a diagram illustrating an alternate embodiment of FIG. 5 wherein the contacts located on the drivers seat are replaced with a buckling mechanism that couples the portable power management system with vehicle power resources.

FIG. 6 is a diagram illustrating an alternate embodiment of FIG. 5 wherein the contacts located on the drivers seat are replaced with a buckling mechanism that couples the portable power management system with vehicle power resources. In particular, a power management system 550 is fitted with a buckle portion 557 having contacts connected to a battery bus 552. A control unit 563 is likewise attached to a buckle portion 561 which matingly engages the buckle portion 557 through manual interaction by the driver. Upon engagement, the battery bus 552 is coupled to the control unit 563 which manages vehicle power delivery from a vehicle power source 565. Such power may then be used by the plurality of docked devices for recharging and operational power.

Figure 7A:
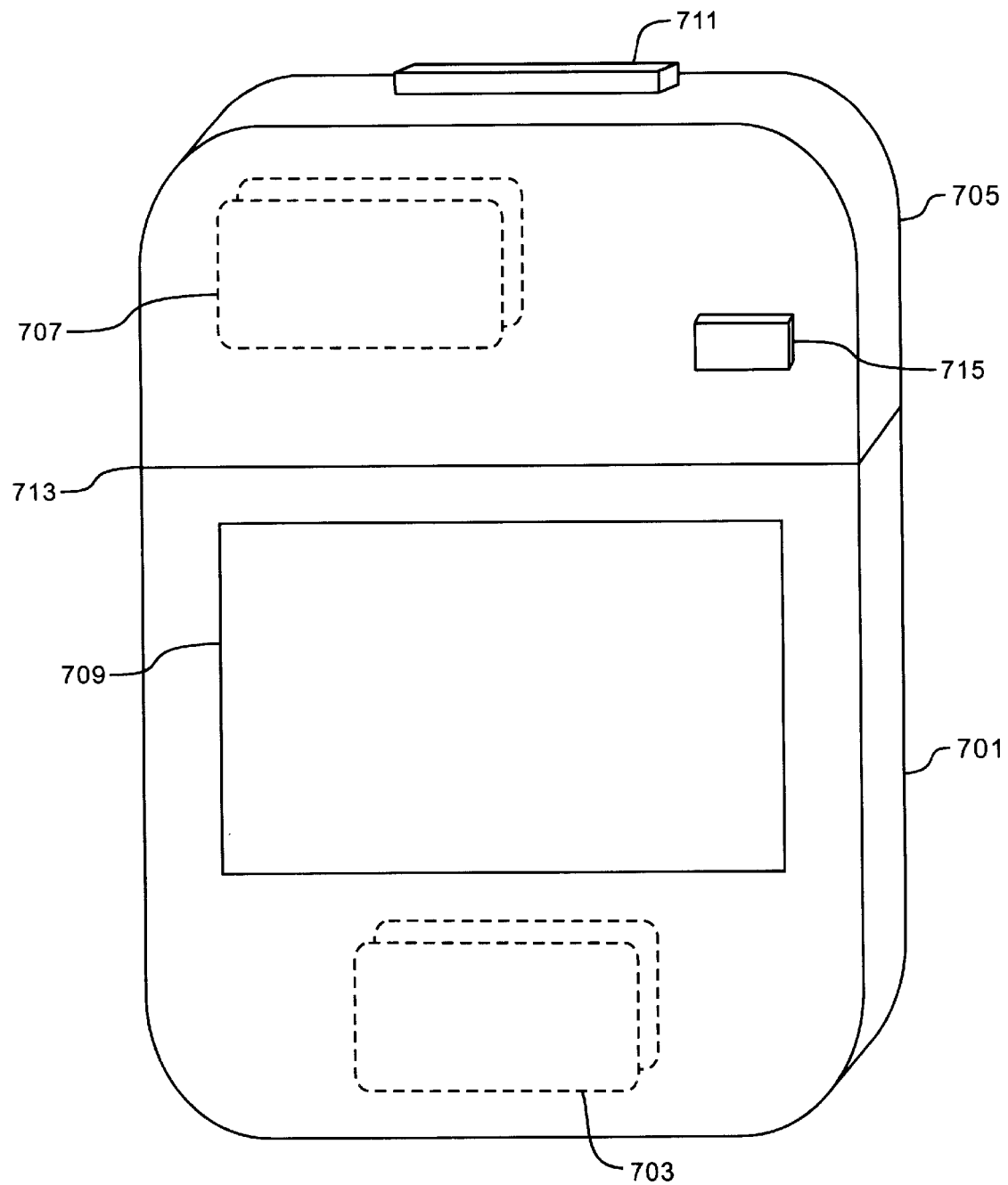
FIG. 7a is a perspective diagram illustrating the functionality of power management in portable power management systems not containing a belt.

FIG. 7a is a perspective diagram illustrating the functionality of power management in portable power management systems not containing a belt. In particular, the scheme discussed previously, along with the many possible variations, may also be implemented when two or more sub-components of a composite portable electronic system matingly engage.

For example, a portable battery management system 713 is made up of two sub-components: 1) a code reader 705 having a battery 707; and 2) a computing device 701 having a battery 703. When matingly engages as shown, the sub-components may operate in a synergistic manner or each sub-component may operate with functionality entirely independent of the other sub-component. Similar operation may also occur when the sub-components are separated. Specifically, when separated, the battery 707 provides power to the code reader 705 so that capturing and decoding coded images may take place. Similarly, the computing device 701 operates using the battery 703 when separated from the code reader 705. The two sub-components may communicate using a wireless link when separated in a manner similar to that when matingly coupled.

When separated, the sub-components utilize their own battery resources. However, when matingly engaged, power management functionality is implemented to extend the operating life of both devices as a pair, minimizing the need for stationary recharging. For example, the code reader 705 may be designed with minimal battery power capacity to accommodate minimal size and weight constraints needed to perform optimal code reading functionality, while the computing device 701 may be designed to house excessive battery capacity for that needed merely for the computing device 701 because size and weight constraints may not be as critical. Thus, in a mode of operation wherein the devices operate apart and together, in a cyclical manner, the code reader unit 705 can utilize battery power from the computing device 701.

With such shared battery resources, the sub-components, as a system, can continue to operate far longer than otherwise would be possible, minimizing the frequency of needing stationary recharging. Moreover, without the foregoing battery resource sharing, when sub-components require mutual or synergistic operation, it does not matter if nearly every sub-component has working power resources. For if only one of the sub-components has depleted its battery resources, the system will not operate. Thus, with resource sharing, such a system can continue functioning much longer.

The code reader 705 having a scanning window 711 and a trigger 715 may also operate in a detached state utilizing solely its battery 707 to perform data collection purposes. When the battery 707 is rung low, the operator may replace it with another recharged battery. Alternately, the code reader 705 can be plugged into computing device 701 having a screen 709 for continued operational and recharging power from the battery 703. After a period of time has passed during which data collection through the mated code reader 705 has taken place, the battery 707 may have reached a sufficient charging level to enable the operator to again remove the code reader 705 for independent operation.

Although the previous example illustrates power resource flow toward the code reader 705, such flow may occur in either direction depending on battery resources, depletion and operational strategy. The power control functionality can be managed by any one or more or all sub-components. If the power control functionality is in both devices, one of them can take precedence over the other, they might negotiate their roles as master or slave, or they might operate as previously described with reference to FIG. 1.

Figure 7B:
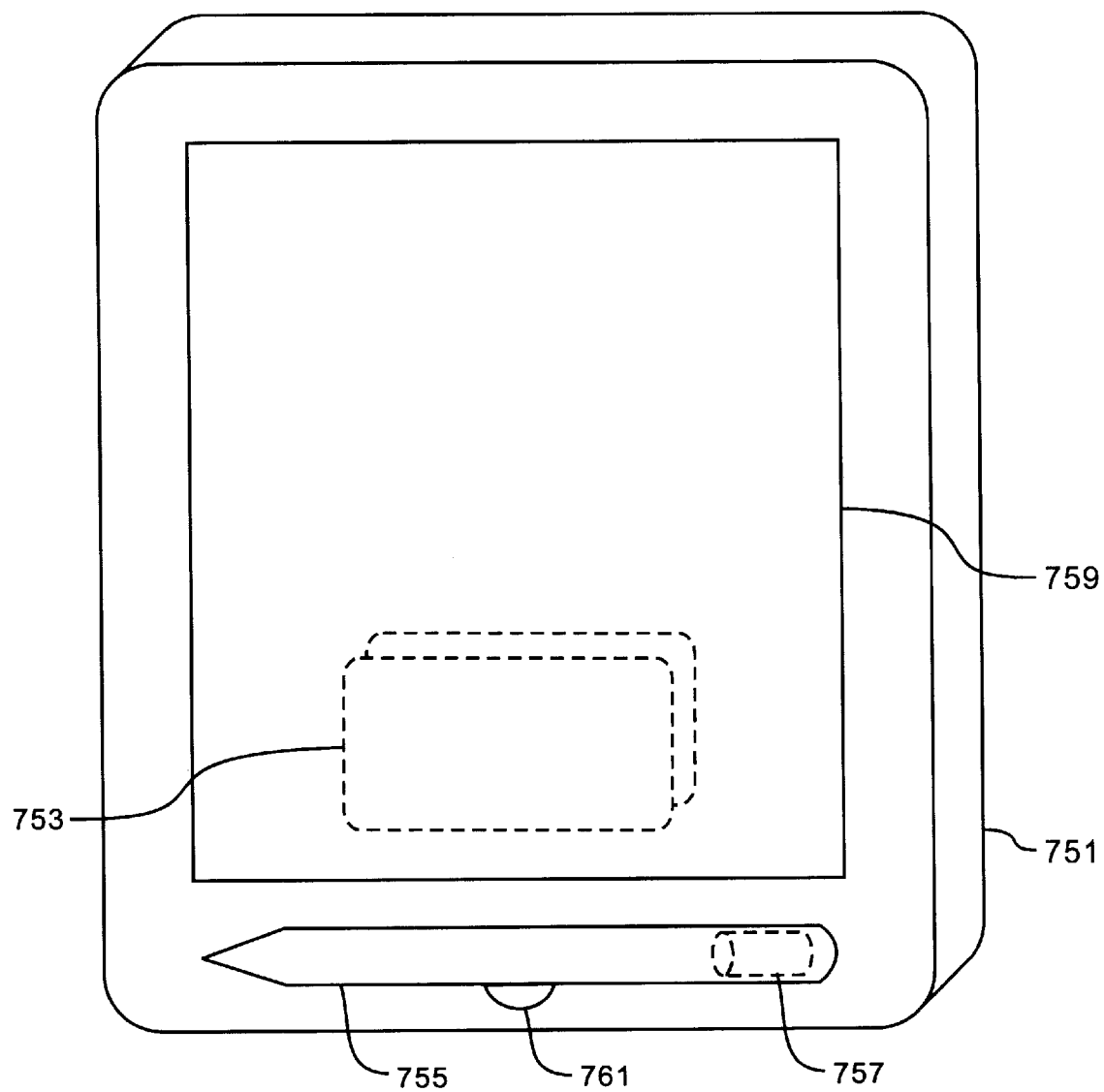
FIG. 7b is a perspective diagram illustrating an embodiment of another exemplary portable power management system such as that of FIG. 7a which comprises matingly engaging sub-components.

FIG. 7b is a perspective diagram illustrating an embodiment of another exemplary portable power management system such as that of FIG. 7a which comprises matingly engaging sub-components. The power management system illustrated includes a battery operated wand reader and pen 755 and a pen-based computing device 751, each of which can be operated individually, that can share power when the two are attached. The wand reader and pen 755 has a battery 757 that supplies power for code reading operations and for pen input functionality via a display 759 of the computing device 751. When docked in a slot in the housing of the computing device 751, the wand reader and pen 755 enters a dormant state, delivering code information, if any, and accepting battery charging power from the battery 753 of the computing device 751. Contacts within the slot (not shown) link the two sub-components when docked.

In addition, when the battery 757 of the electronic pen 755 is running low on power, the electronic pen 755 beeps to indicate to the operator a need for docking. In this case, the battery 753 acts as the master while the battery 757 of the pen acts as the slave for power sharing and power control purposes. In other words, the battery 753 of the computing device 751 provides power to the battery 757 and to the reader/pen 755, but the batter 757 only powers itself. This is because of the great disparity in battery resources between the two batteries. Power management functionality may be located in the computing device 751, the reader/pen 755, or in both.

Figure 8:
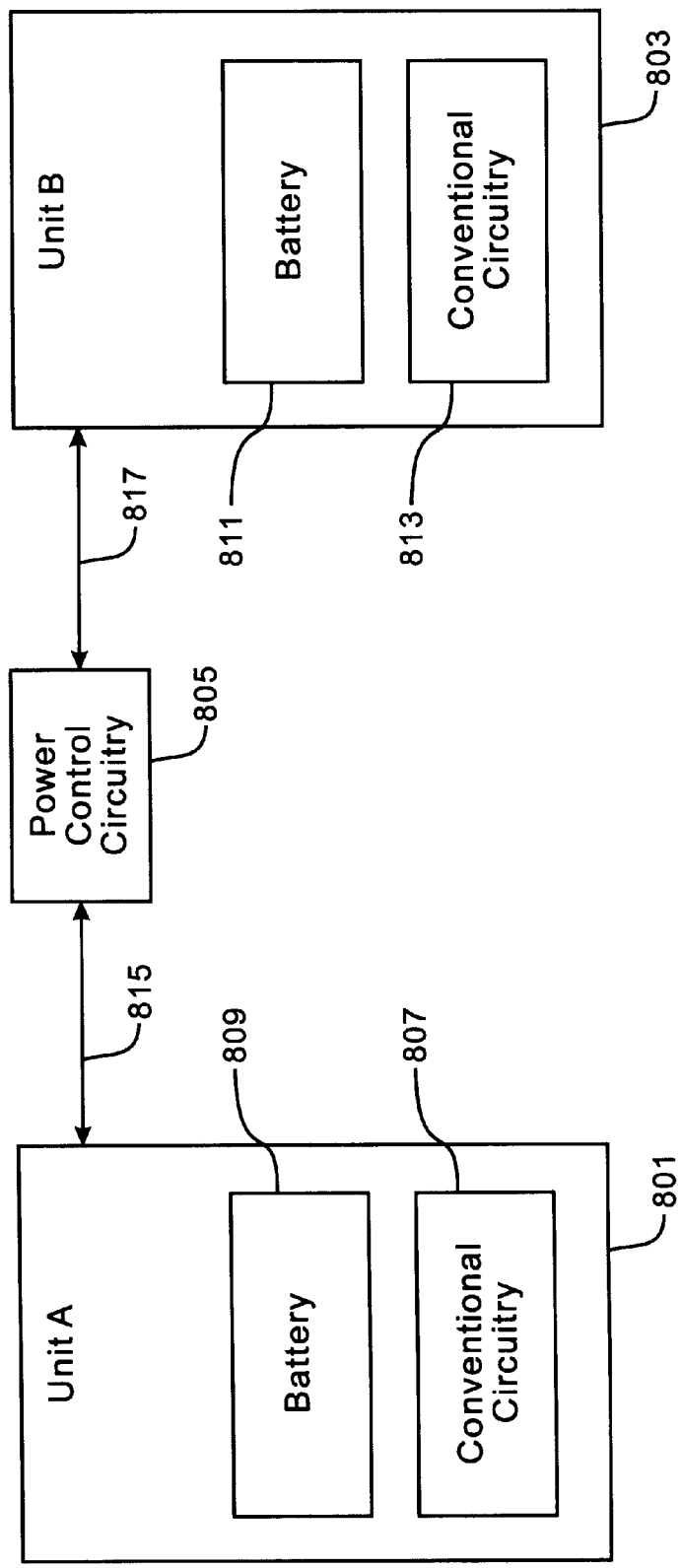
FIG. 8 is a schematic diagram that illustrates variations in location and operation of power management functionality (including hardware and associated software) within a portable power management system.

FIG. 8 is a schematic diagram that illustrates variations in location and operation of power management functionality (including hardware and associated software) within a portable power management system. Power control circuitry that manages power between two electronic battery operated devices, e.g., a unit A 801 and a unit B 803, may exist as illustrated, independent from such devices.

In particular, a power control circuitry 805 is located external to the unit A 801 and the unit B 803. The unit A 801 and unit B 803 operate when separate or when joined via the power control circuitry 805, and, in either case, they may operate with synergistic simultaneous functionality or independently of one another.

When the unit A 801 and unit B 803 are connected via the power control circuitry 805, the power levels of the batteries within the two devices are compared and power is supplied toward the unit that is determined to be in need battery power. Factors considered by the power control circuitry 805 include energy stored, anticipated energy needs, and unit type.

In addition, if the operation of unit A is considered to be more important than that of unit B and if the power levels of the batteries of the both devices are low and the batteries are in need of a recharge, the power control circuitry 805 may decide to transfer the power of the battery 811 of the unit B 803 to the battery 809 of the unit A 801. In this case, the device unit B is taken out of operation and its power is transferred to the other device. It can be appreciated that many other management schemes and variations may be implemented. For example, a simplistic scheme such as when the battery 807 always provides power toward the unit 803 may be implemented to accommodate embodiments such as that shown in FIG. 7b.

Figure 9:
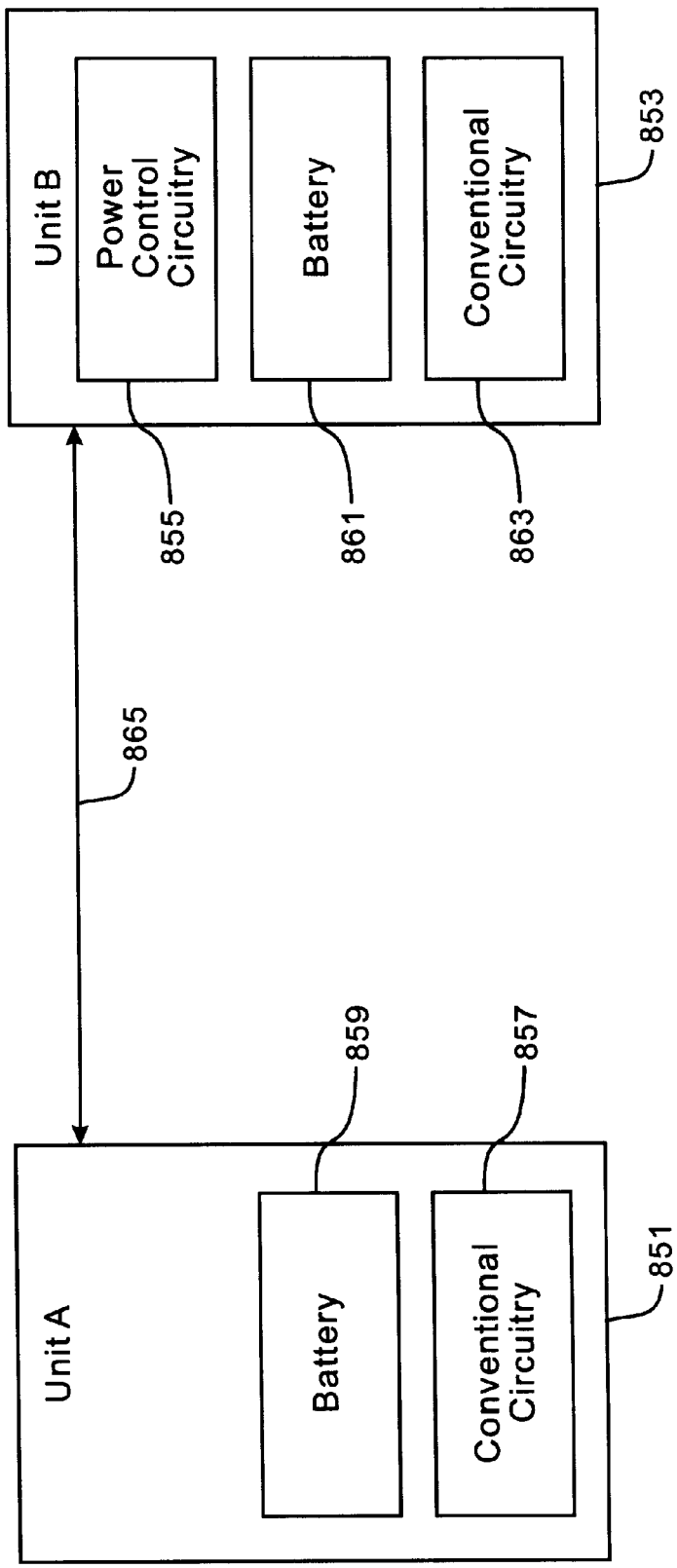
FIG. 9 depicts another power management system where a power control circuitry 855 that manages power between two electronic battery operated devices (or sub-components) is included in one of the devices.

FIG. 9 depicts another power management system where a power control circuitry 855 that manages power between two electronic battery operated devices (or sub-components) is included in one of the devices. When the two electronic devices, a unit A 851 and a unit B 853, are connect over a power bus 865, the power control circuitry 855 manages the power levels of the battery 859 of the unit A device 851 and the battery 861 of the unit B device 853. In this situation, the unit B 853 may act as a master device for power control while the unit A 851 may act as a slave. Other functional interaction as discussed for example in relation to FIGS. 2a–c may alternately be implemented.

Figure 10:
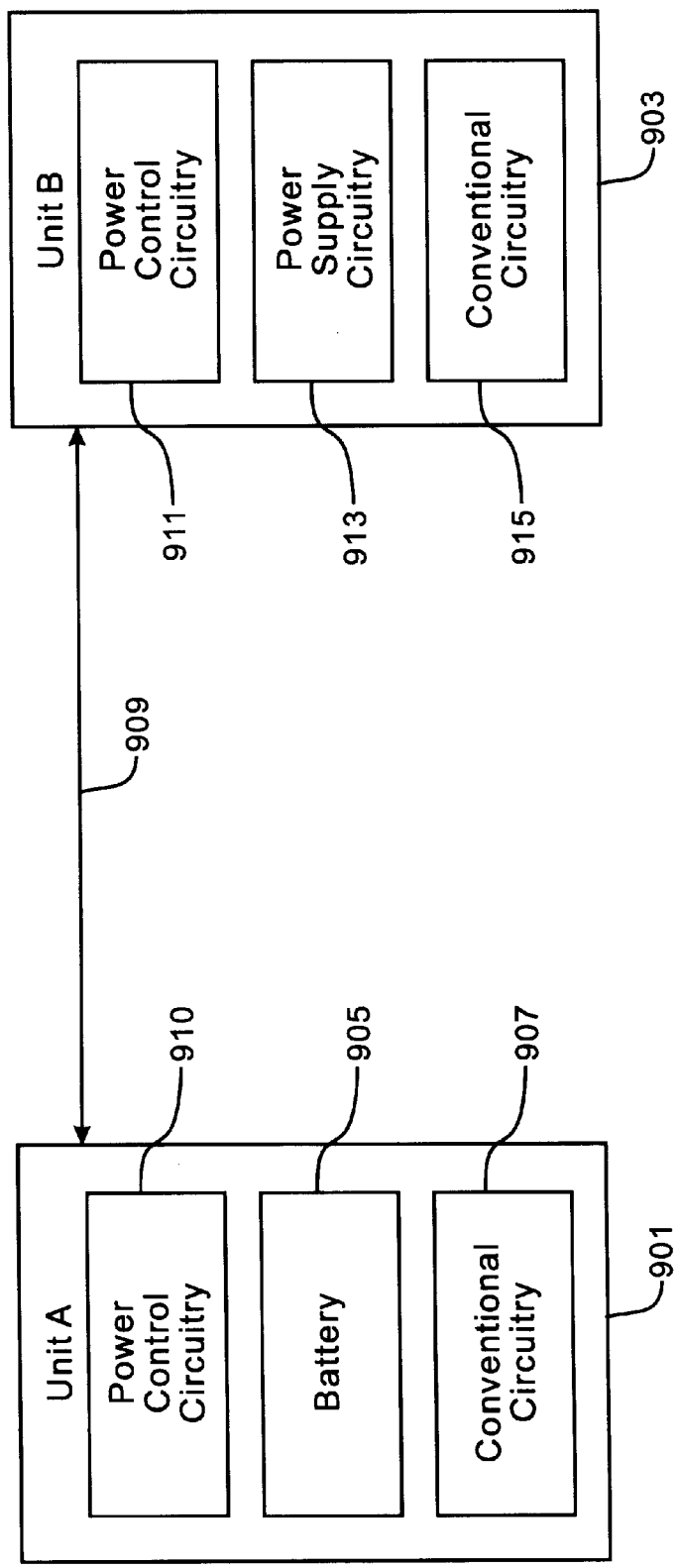
FIG. 10 depicts an alternate embodiment of the power management system wherein power control functionality is distributed within a plurality of battery powered electronic devices.

FIG. 10 depicts an alternate embodiment of the power management system wherein power control functionality is distributed within a plurality of battery powered electronic devices. Specifically, power supply circuitry 910 and 913 found in a unit A 901 and a unit B 903 cooperatively operate to carry out power management functionality via a power bus 909 (as described in the various embodiments mentioned previously). Although the power control circuitry in one of the units may be configured to dominate power management functionality, both may be configured to participate equally.

In addition, in an alternate embodiment, a power supply circuit 913 in the unit B 903 provides both battery power and, when available, access to a larger energy source. When the larger energy source is available, that source is used as much as possible by both of the units A and B, 901 and 903. Thus, the power management functionality operates in a master/slave configuration when such larger energy source is available, and enters an alternate mode of power sharing when that source is not available.

For example, the unit B 903 may occasionally couple to AC power source. When this occurs, the unit A 901, which may not be able to directly couple to the AC power source, may do so indirectly via docking with the unit B 903. In this way, power supply circuitry needed to adapt the AC power source for use in powering the units A 901 and B 903 need not be located in both units. Only one, the unit B 903, needs to be so configured.

Although FIGS. 8–11 illustrate pairs of sub-components, may additional sub-components may be added to each of such the portable power management systems.

Figure 11:
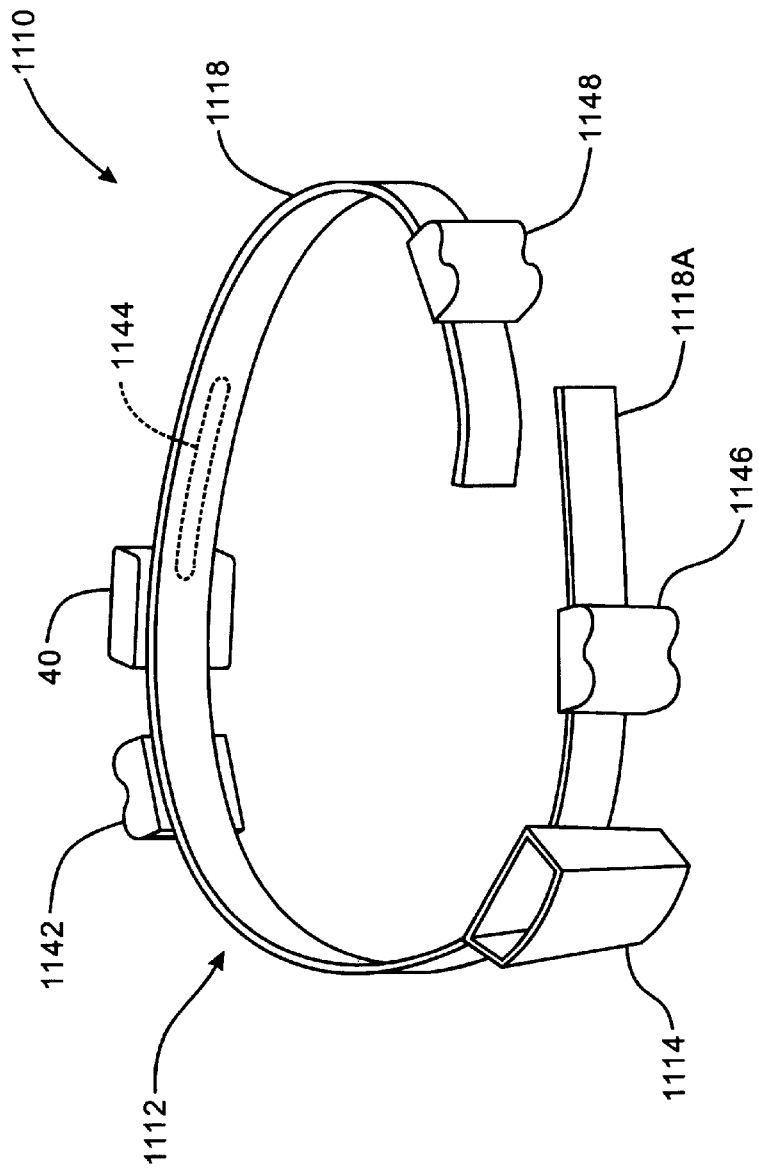
FIG. 11 is another diagrammatic illustration of a user-supported information capture system in accordance with the present invention.

FIG. 11 is a diagrammatic illustration of a user-supported information capture system 1110 in accordance with the present invention, comprising a user-worn personal communication and docking system 1112 having a docking receptacle 1114 which removably receives a data capture system 1116. In the example of FIG. 11, the docking receptacle 1114 is shown as removably secured to a belt 1118 which is to be fastened about the waist of a user, e.g., by means of cooperating end sections 1118A and 1118B of synthetic material which adhere where pressed together (such material being available commercially under the trademark VELCRO).

Figure 12A:
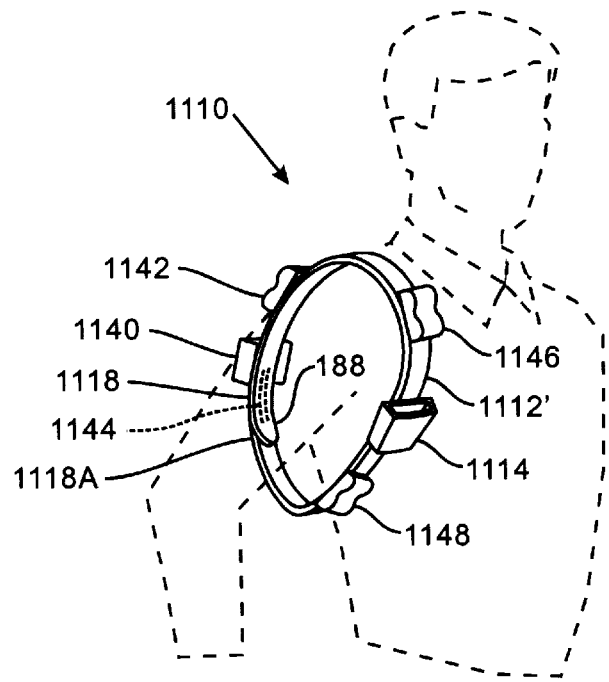
FIGS. 12A and 12B are diagrammatic views showing an information capture system of the present invention wherein a belt is worn as a sling supported about the user's right or left shoulder and extending across the chest of a user.
Figure 12B:
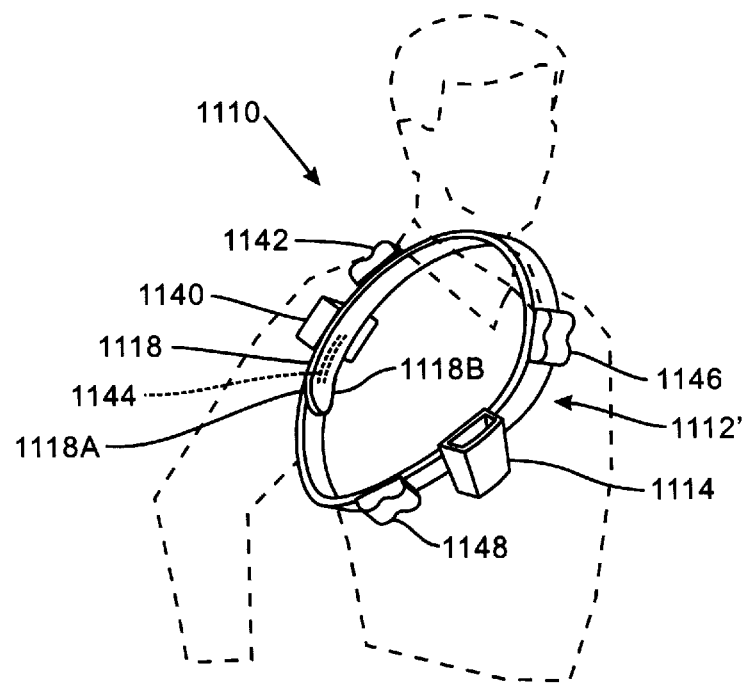

FIGS. 12A and 12B are diagrammatic views showing an information capture system 1110 wherein the belt 1118 is to be worn as a sling supported about the user's right or left shoulder (e.g., the left shoulder in FIG. 12) and extending across the user's chest (and about the user's right side at about waist level for the disposition shown in FIG. 12).

In FIGS. 11, 12A and 12B, an exemplary communications apparatus is indicated at 1140 which may be powered by a battery supply unit 1142. Where the communications means 1140 includes a radio-frequency transceiver, for example a PC card conforming to PCMCIA interface standards, an appropriate antenna may be coupled at the RF input/output of the transceiver, and be protectively encased within the belt 18 as indicated at 44. Spare battery packs such as 1146, 1148 may be located at convenient points along the belt so that these battery packs are readily accessible should it be desired to replace the battery in the hand-held data capture terminal 1118 with one of these spare packs. FIG. 12B shows the apparatus slung about a first shoulder of the operator and slung under the armpit of the second shoulder to accommodate the load of the system 1110 and to minimize slippage.

Figure 13:
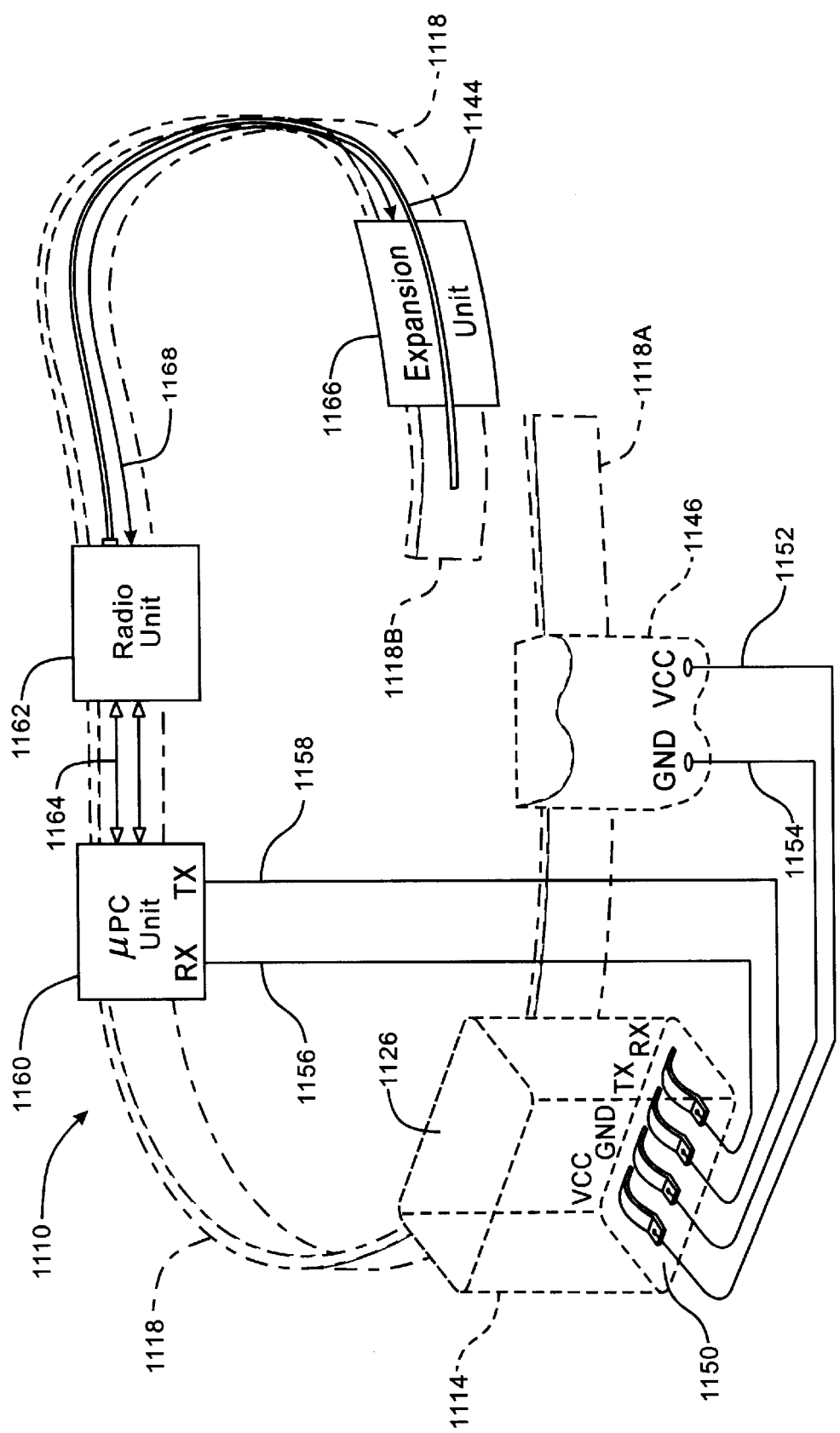
FIG. 13 is a diagrammatic view illustrating an exemplary arrangement of components on the belt shown in FIGS. 11, 12A and 12B.

FIG. 13 is a diagrammatic view illustrating an exemplary arrangement of components on the belt 1118 of FIG. 11 or FIGS. 12A and 12B. In FIG. 13, the communications apparatus 1140 of FIGS. 11, 12A, and 12B is shown as comprised of microprocessor control module 1160 and a radio unit 1162. The interior portion 1126 of docking receptacle 1114 is designed to receive a portable data terminal (such as the terminal shown in FIGS. 14, 15, 17B and 17C) and may contain a plurality of electrical docking contacts 1150 which connect to mating contacts on a data terminal. By way of example, the docking contacts 1150 preferably include power supply signals (VCC and GROUND) which are electrically connected to battery sources 1146 via connections 1152 and 1154 to charge the battery of the data terminal while docked in the docking receptacle 1114. The contacts 1150 also preferably include transmitter and receiver data lines (TX and RX respectively) which electrically connect to microprocessor unit 1160 via lines 1156 and 1158 to communicate with a radio transceiver (RADIO UNIT) 1162 for radio frequency communications and data transfer. The radio unit 1162 communicates with the microprocessor unit 1160 via data bus 1164. The antenna 1144 of the radio unit is preferably a flexible type antenna which is contained within or mounted upon the belt 1118 and is capable of flexing along with the flex of the belt 1118. An expansion unit (EXPANSION UNIT) 1166 is also provided which allows for additional processing features to be added to the belt (e.g., additional memory, transceiver modules, etc.). The expansion unit 1166 couples to the other components of the belt via communications line 1168.

By way of illustrative example, NORAND Corporation of Cedar Rapids, Iowa manufactures hand-held data capture terminals such as the module 6100 and 6400 which are provided with a standard eight contact docking connector as shown in FIGS. 14, 15, and 16. The data terminal 1116 preferably includes a standard eight pin female type recessed connector 1174 at the proximal end 1170 of the terminal 1116. The data terminal 1116 may also include other types of data transfer links such as an infrared data port 1172 for transferring data between the docking receptacle 1114 and the terminal 1116 via infrared transmissions.

FIG. 15 illustrates the arrangement for the contacts of the standard connector 1174 of the data terminal 1116 shown in FIG. 14. An exemplary pin-out arrangement of connector pins 1–8 is given in FIG. 16 in a somewhat tabular format.

Figure 17A:
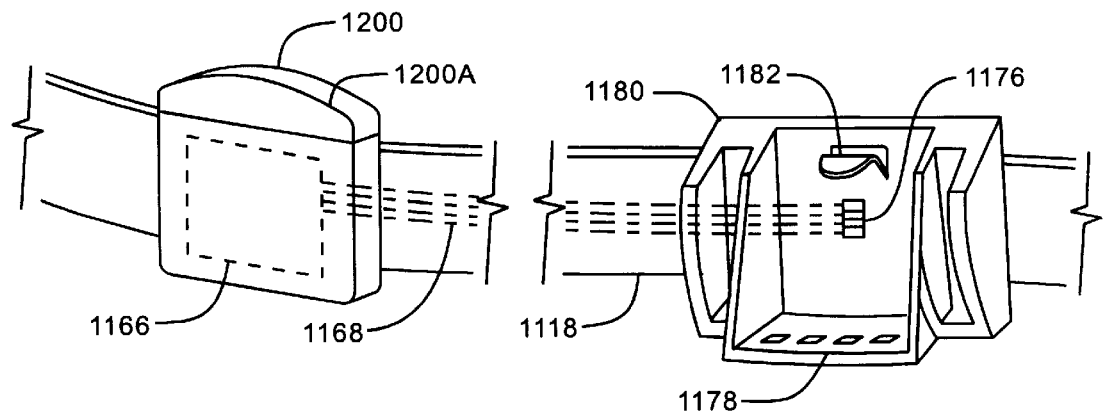
FIGS. 17A, 17B, and 17C is a diagrammatic view of exemplary docking receptacles of the present invention for receiving hand-held data capture terminals.
Figure 17B:
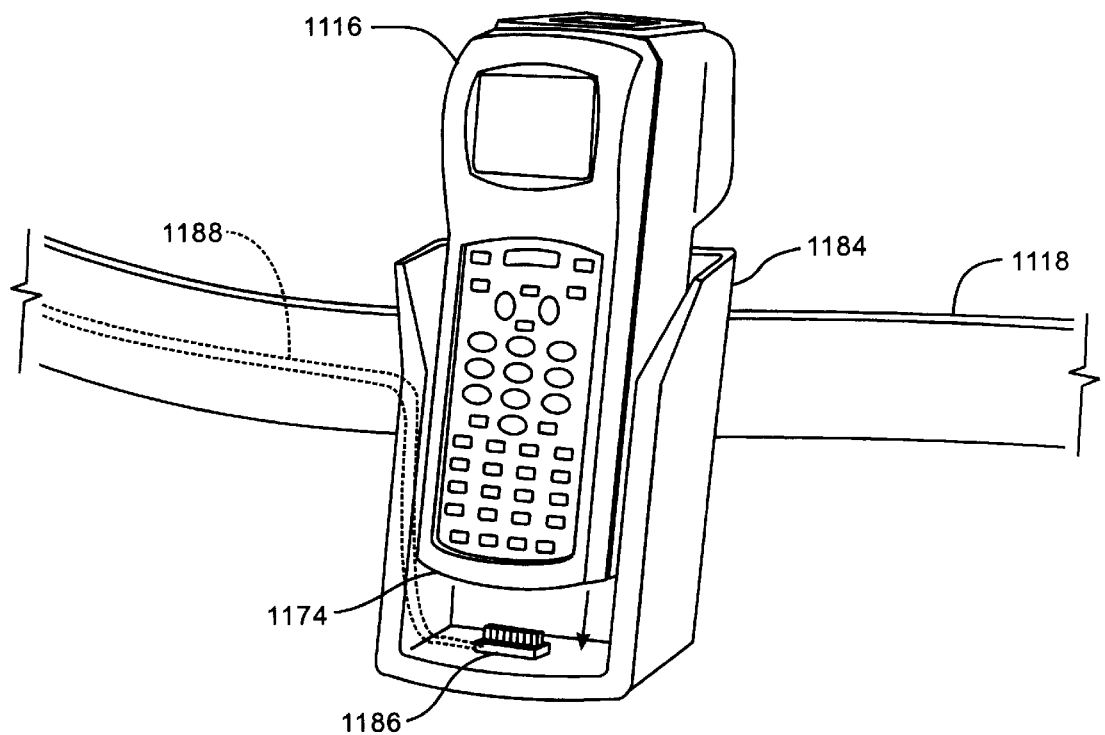
Figure 17C:
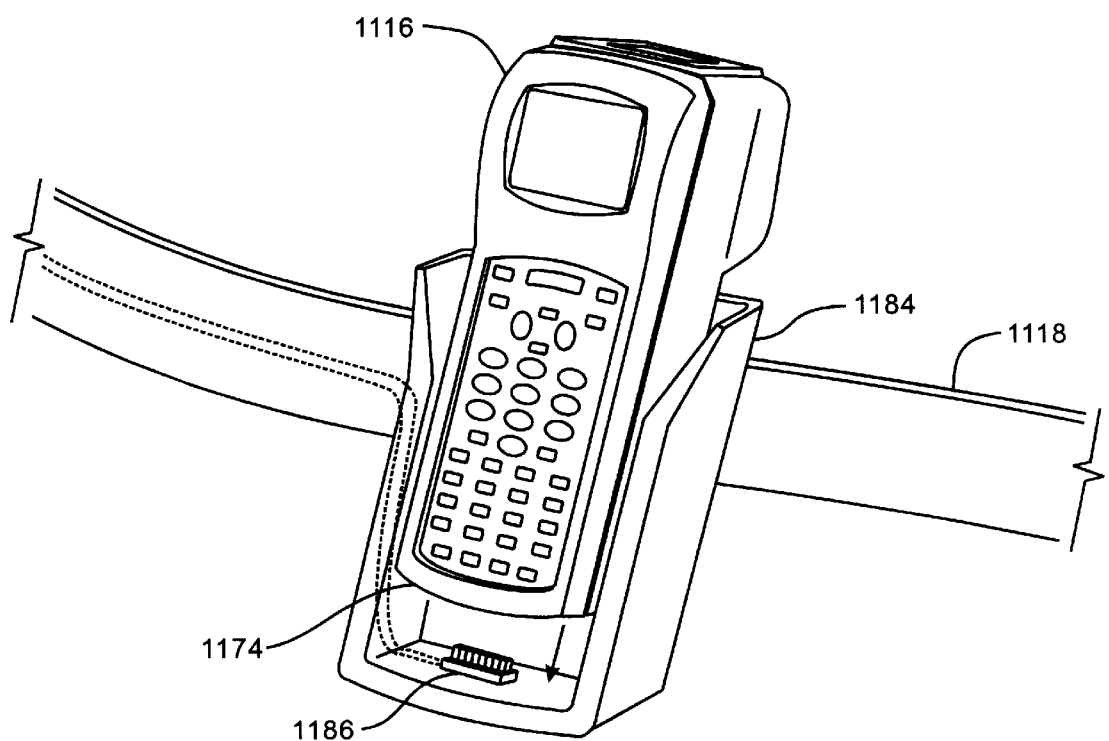

FIGS. 17A, 17B, and 17C are a diagrammatic illustration of the insertion of a data terminal into a docking apparatus of the present invention wherein a preferred positioning of a docking receptacle is shown. The docking receptacle 1180 as shown in FIG. 14 is preferably disposed on the belt 1118 such that the force of gravity urges the terminal 1116 (such as shown in FIG. 17B) to remain in the docking receptacle 1180. The docking receptacle 1180 of FIG. 17A may include a latch type fastener 1182 which aids in securely retaining a data terminal therein. The docking receptacle preferably includes contacts 1176 which mate with contacts on the terminal to provide a communication link to expansion unit 1166 via communications link 1168 for data transfer therebetween. The expansion unit 1166 may be contained in an expansion unit housing 1200 accessible by a removable lid 1200A. Alternatively, the expansion unit may be the microprocessor unit 1160 of FIG. 13.

FIG. 17B shows an alternate docking receptacle 1184 receiving a data terminal wherein a female connector unit 1174 (as shown in FIGS. 14 and 15) mates with a cooperating male connector 1186 in the docking receptacle. Male connector connects to communications link 1188 which provides connection to other components of the docking system 1112 (e.g. microprocessor unit 1160, battery unit 1146, etc.). FIG. 17 illustrates a preferred mounting angle of a docking receptacle 1184 on belt 1118. The docking receptacle is preferably rotated with respect to the line defined by belt 1118 such that the terminal 1116 points in a direction ergonomically accessible by an operator (i.e., the receptacle points towards the front of the user to easily accommodate insertion and removal of the terminal). The thus described embodiment maximizes both the retention of the terminal 1116 in the docking receptacle due to the force of gravity and the ease of insertion and removal of the terminal 1116 into and from the receptacle. In a preferred embodiment, the receptacle 1184 is rotated 30 degrees toward the user with respect to a line perpendicular to the line defined by belt 1118.

In view of the above detailed description of a preferred embodiment and modifications thereof, various other modifications will now become apparent to those skilled in the art. The contemplation of the invention below encompasses the disclosed embodiments and all reasonable modifications and variations without departing from the spirit and scope of the invention.

I claim:

1. A portable battery management system comprising:
   a plurality of electronic devices, each containing a battery and independently operable when powered by the battery;
   a belt that supports the plurality of electronic devices;
   a power bus, attached to the belt, that connectively engages ones of the plurality of electronic devices that are supported by the belt;
   at least one of the plurality of electronic devices being designated to provide power from its battery to the power bus when the at least one of the plurality of electronic devices is supported by the belt; and
   the power bus supplies power from the at least one of the plurality of electronic devices to the others of the plurality of electronic devices that are supported by the belt and are connectively engaged to the power bus.

2. The portable battery management system of claim 1 further comprising:
   one or more independent batteries selectively supported by the belt and, when supported, coupled to the power bus; and
   the one or more independent batteries being capable of replacing the battery in one or more of the plurality of electronic devices.

3. The portable battery management system of claim 2 wherein the one or more independent batteries are used as a power source to supply power on the power bus before the battery of one of the plurality of electronic devices is used to supply power to the power bus.

4. The portable battery management system of claim 1 further comprising power control circuitry, and the power control circuitry identifies a hierarchy of power sources to supply power on the power bus.

5. The portable battery management system of claim 3 further comprising power control circuitry, and the power control circuitry collects information from at least one of the plurality of electronic devices to identify at least one of the plurality of electronic devices to be used in supplying power to the power bus.

6. The portable battery management system of claim 1 further comprising:
   an external power source; and
   contacts for coupling the external power source to the power bus.

7. The portable battery management system of claim 6 wherein the external power source comprising a vehicle power source.

8. The portable battery management system of claim 7 wherein the contacts utilize magnetic attachment.

9. The portable battery management system of claim 7 wherein the contacts are disposed on the belt.

10. A roaming computing system comprising:
    a power bus;
    a plurality of docking adapters interconnected by the power bus;
    a plurality of electronic devices, each of the plurality of electronic devices having a battery to power its operation;
    each of the plurality of docking adapters capable of docking at least one of the plurality of electronic devices;
    each of the plurality of docking adapters connectively coupling the docked one of the plurality of electronic devices to the power bus;
    each of the plurality of electronic devices capable of receiving power from the power bus via the one of the plurality of docking adapters to which it is docked; and
    the battery of at least one of the plurality of electronic devices that is currently docked supplies power, over the power bus, to at least one of the others of the plurality of electronic devices currently docked.

11. The roaming computing system of claim 10 further comprising:
    one or more rechargeable replacement batteries, each battery docked in an associated dock and connected to the docks of the plurality of electronic devices by the power bus;
    one of the one or more replacement batteries or the battery of one of the plurality of electronic devices supplies power, on the power bus, to the others of the said plurality of electronic devices that are currently docked and connectively engaged to the power bus.

12. The roaming computing system of claim 11 further comprising:
    a master controller associated with one of the said plurality of battery operated electronic devices;
    a plurality of slave controllers, each of the plurality of slave controllers associated with and linked to a specific one of the said plurality of battery operated electronic devices that does not have an associated master controller;
    the master controller sends commands to the said plurality of slave controllers to manage the delivery of power on the power bus to the electronic devices associated with each of the said plurality of slave controllers.

13. The roaming computing system of claim 12 wherein the master controller is external to the associated one of the plurality of electronic devices.

14. The computing system of claim 12 wherein the master controller is located at the associated one of the plurality of electronic devices.

* * * * *